US009792675B1

(12) United States Patent
Lina et al.

(10) Patent No.: US 9,792,675 B1
(45) Date of Patent: Oct. 17, 2017

(54) OBJECT RECOGNITION USING MORPHOLOGICALLY-PROCESSED IMAGES

(71) Applicant: Matrox Electronic Systems, Ltd., Dorval (CA)

(72) Inventors: Arnaud Lina, Montreal (CA); Jean-Sébastien Lemieux, Montreal (CA); Jérôme Dubois, Montreal (CA)

(73) Assignee: Matrox Electronic Systems, Ltd., Dorval (CA)

( * ) Notice: Subject to any disclaimer, the term of this patent is extended or adjusted under 35 U.S.C. 154(b) by 255 days.

(21) Appl. No.: 14/797,504

(22) Filed: Jul. 13, 2015

Related U.S. Application Data

(60) Provisional application No. 62/088,534, filed on Dec. 5, 2014.

(51) Int. Cl.
*G06K 9/46* (2006.01)
*G06T 5/30* (2006.01)
*G06T 7/00* (2017.01)

(52) U.S. Cl.
CPC .............. *G06T 5/30* (2013.01); *G06T 7/0065* (2013.01); *G06T 2207/20012* (2013.01); *G06T 2207/20036* (2013.01)

(58) Field of Classification Search
None
See application file for complete search history.

(56) References Cited

U.S. PATENT DOCUMENTS

| | | | | |
|---|---|---|---|---|
| 8,908,944 B2 * | 12/2014 | Ishikawa | ............... | G06T 7/0032 382/128 |
| 2004/0077950 A1 * | 4/2004 | Marshik-Geurts | ... | A61B 5/0086 600/475 |
| 2007/0061735 A1 * | 3/2007 | Hoffberg | ............... | G06F 9/4443 715/744 |
| 2009/0028440 A1 * | 1/2009 | Elangovan | ........... | G06K 9/6202 382/216 |
| 2011/0299770 A1 * | 12/2011 | Vaddadi | ............... | G06K 9/6211 382/165 |
| 2016/0314587 A1 * | 10/2016 | Ishikawa | ............... | A61B 5/055 |

* cited by examiner

*Primary Examiner* — Iman K Kholdebarin
(74) *Attorney, Agent, or Firm* — Rhodes Donahoe, LLC; Robert V. Donahoe

(57) ABSTRACT

A method for recognizing an occurrence of an object in an image is provided where the appearance of the object may vary from one occurrence to another. The method includes defining a model set for object recognition, the model set including at least one model, acquiring a target image, processing the target image according to a set of morphological operations to obtain a set of morphologically-processed target images, performing object recognition on the set of morphologically-processed target images for the defined model set, and selecting at least one candidate occurrence of a model of the defined model set in the target image based on the object recognition performed on the set of morphologically-processed target images.

35 Claims, 14 Drawing Sheets

OBJECT RECOGNITION USING MORPHOLOGICALLY-PROCESSED IMAGES

RELATED APPLICATIONS

The application claims the benefit under 35 U.S.C. §119 (e) to U.S. Provisional Application Ser. No. 62/088,534, entitled "OBJECT RECOGNITION USING MORPHOLOGICALLY-PROCESSED IMAGES," filed on Dec. 5, 2014, the disclosure of which is herein incorporated by reference in its entirety.

BACKGROUND OF INVENTION

1. Field of Invention

Embodiments of the invention generally relate to object recognition. More specifically, at least one embodiment relates to object recognition using morphologically-processed images.

2. Discussion of Related Art

Object recognition is employed in a wide variety of fields to locate real world objects that appear in images recorded by cameras or other image acquisition devices. For example, object recognition is used in manufacturing, medical imaging, security and transportation. Computer vision systems and/or machine vision systems often operate to acquire, process and analyze images to extract information in the preceding and other applications.

However, the appearance of an object in the acquired image can widely vary due to variations in the object itself (e.g., due to variations in the manufacturing process, degradation over time, etc.), lighting conditions during image acquisition, the object's orientation, the object's distance from the image acquisition system, the object's motion, occlusion of the object, characteristics of the image acquisition device and other factors. As a result, the problem of object recognition is not always readily solved.

Model-based approaches provide one current form of object recognition. According to these approaches, a user provides a system with an image of an object for which occurrences are to be recognized. Such an image can be an image acquired by a camera or a synthetic image output by a software application. This image serves as a "model" image that can be used by the system to determine the occurrence of the object in images that are subsequently analyzed by the system. For example, a "target" image can be analyzed to locate an occurrence of the object represented in the model image. In general, the object recognition is performed by analyzing the target image compared to the model image. According to some approaches, values of pixels in the target image are compared with the values of pixels in the model image. Other approaches extract features from the target image (for example, the edges of objects within the target image) and compare them with similar features extracted from the model image.

Generally, object recognition systems have greater difficulty recognizing an object in a target image the greater the object's appearance differs from the appearance of the object in the model image. When the same object differs in appearance relative to the object in the model image, the object in the target image may be referred to as a "variant form" of the object in the model image.

FIG. 1 illustrates seven variants of the same object located in seven different images 110A-110G as just one example. In the images 110A-110G, the objects 120A-120G have the same general shape. In this example, the shape is the letter L located in the center of a square frame. In the image 110A, the object 120A is a solid object (i.e., of a generally uniform color) where the object 120A is in a color lighter than the background. In the image 110B, the object 120B is in a color darker than the background. Also, the image 110A and the image 110B have different polarities relative to one another. In the image 110C, the object 120C is a solid object with an accentuated outline 140C. In the image 110D, the object 120D includes a collection of solid objects 150D. In the image 110E, the object 120E is thicker than the object 120A of the image 110A (with the outline of the object 120A shown in phantom). In the image 110F, the object 120F is thinner than the object 120A (again with the outline of the object 120A shown in phantom). Note that it is the thickness and not the scale of the object that has changed in images 110E and 110F relative to image 110A. In the image 110G, the object 120G includes a collection of objects 150G, with an accentuated outline 140G. In addition, the polarity of the object 120G is reversed relative to the object 120A of the image 110A. Thus, the objects 120A-120G provide seven variant forms of an object that includes an L located in the center of a square frame.

Approaches have been proposed to allow object recognition systems to recognize variant forms of objects. However, these approaches have shortcomings because they are unable to directly recognize an object that appears in a variant form in a target image. Instead, a user must provide a model image for each of the expected forms. The current approaches are then constrained to work only with those expected forms. Further, generation of model images for all the various forms of an object is time consuming for the user burdened with generating the models. In some instances, models for all of the variant forms may not even be available. For example, machine vision systems are employed in semiconductor wafer manufacturing where variant forms of objects are naturally occurring and unpredictable.

SUMMARY OF INVENTION

Therefore there is a need for apparatus, systems and methods for efficiently recognizing objects in an image where variant forms of the objects may be unpredictable.

According to one aspect, a method for recognizing an occurrence of an object in an image is provided where the appearance of the object may vary from one occurrence to another. According to some embodiments, the method includes acts of defining a model set for object recognition, the model set including at least one model, acquiring a target image, processing the target image according to a set of morphological operations to obtain a set of morphologically-processed target images, performing object recognition on the set of morphologically-processed target images for the defined model set, and selecting at least one candidate occurrence of a model of the defined model set in the target image based on the object recognition performed on the set of morphologically-processed target images. In one embodiment, the method includes an act of selecting the set of morphological operations based on expected variations in an appearance of the object in the target image.

According to another embodiment, the set of morphological operations is a first set of morphological operations, and the act of defining the model set for object recognition includes acts of: acquiring a model image, processing the model image according to a second set of morphological operations to obtain a set of morphologically-processed model images; and creating a model from each of the morphologically-processed model images, respectively. In a further embodiment, the method includes an act of selecting the second set of morphological operations based on expected variations in an appearance of the object in the model image.

According to a still further embodiment, the method includes a refinement stage performed by defining a second model set for the refinement stage by processing the model image according to a third set of morphological operations to obtain a second set of morphologically-processed model images, and creating a model from each morphologically-processed model image included in the second set of morphologically-processed model images, respectively; and performing object recognition on the set of morphologically-processed target images for the second model set only for regions of the target image around the at least one selected candidate occurrence. According to yet a further embodiment, the method includes receiving a mask associated with the model image and performing a morphological operation on the mask.

According to another aspect, a non-transitory computer-readable medium is provided whose contents cause a processing device including a processor to perform a method of recognizing an occurrence of an object in an image, where the appearance of the object may vary from one occurrence to another. According to these embodiments, the method includes defining a model set for object recognition, the model set including at least one model, acquiring a target image, processing the target image, by the processor, according to a set of morphological operations to obtain a set of morphologically-processed target images, performing object recognition, by the processor, on the set of morphologically-processed target images for the defined model set, and selecting at least one candidate occurrence of a model of the defined model set in the target image, by the processor, based on the object recognition performed on the set of morphologically-processed target images.

According to yet another aspect, an apparatus includes a memory configured to store at least one model image, one or more processors coupled to the memory, an image acquisition device coupled to the one or more processors, the image acquisition device configured to acquire a target image and a computer storage medium storing instructions that, when executed by the one or more processors, cause the one or more processors to perform operations that recognize an occurrence of an object in the target image, where the appearance may vary from one occurrence to another. In some embodiments, the operations include defining a model set for object recognition, the model set including the at least one model image, processing the target image according to a set of morphological operations to obtain a set of morphologically-processed target images, performing object recognition on the set of morphologically-processed target images for the defined model set, and selecting at least one candidate occurrence of a model of the defined model set in the target image based on the object recognition performed on the set of morphologically-processed target images.

According to one embodiment, the image acquisition device includes a camera configured to capture the target image. In a further embodiment, the apparatus includes a mobile phone including the camera. According to another embodiment, at least one model image includes a synthetic image output by a software application.

According to still another aspect, a system includes an image acquisition device configured to acquire a target image, one or more processors coupled to the image acquisition device, and a computer storage medium storing instructions that, when executed by the one or more processors, cause the one or more processors to perform operations that recognize an occurrence of an object in the target image, where an appearance of the object may vary from one occurrence to another. According to some embodiments, the operations include defining a model set for object recognition, the model set including at least one model, processing the target image according to a set of morphological operations to obtain a set of morphologically-processed target images, performing object recognition on the set of morphologically-processed target images for the defined model set, and selecting at least one candidate occurrence of a model of the defined model set in the target image based on the object recognition performed on the set of morphologically-processed target images.

As used herein the term "morphology," "morphological" or "morphologically" refers to image processing operations that transform images according to the principles of mathematical morphology. A morphological operation processes an input image using a structuring element to obtain an output image. The value of a pixel in the output image is determined based on the values of pixels in a neighborhood of the corresponding pixel in the input image.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments described herein employ morphological operations on either or both of model images and target images in model-based object recognition processes.

In the context of image processing, morphological operations are image processing operations that transform images according to the principles of mathematical morphology.

A morphological operation processes an input image using a structuring element to obtain an output image (generally having the same dimensions as the input image). The value of each pixel in the output image is determined based on the values of pixels in a neighborhood of the corresponding pixel in the input image. The size and shape of the structuring element determine the size and shape of the neighborhood of pixels in the input image. Generally, a morphological operation is a non-linear operation.

Dilation and erosion are two types of morphological operations employed in image processing. Dilation and erosion may also be referred to as the Minkowski sum and Minkowski difference, respectively.

In the case of a basic dilation operation, the value of each output pixel is set to the maximum value among the values of the pixels in the neighborhood of the corresponding input pixel. This definition applies to both grayscale and binary images. In the case of an input image of a lighter object appearing on a darker background, performing a dilation results in an output image where the object appears thicker or larger (depending on the shape of the object).

In the case of a basic erosion operation, the value of each output pixel is set to the minimum value among the values of the pixels in the neighborhood of the corresponding input pixel. Again, this definition applies to both grayscale and binary images. In the case of an input image of a lighter object appearing on a darker background, performing an erosion results in an output image where the object appears thinner or smaller (depending on the shape of the object).

In some cases, each position in the structuring element may be associated with a weight. In these cases, for a dilation or erosion operation, the value of each output pixel is set to the maximum or minimum value (respectively) among the weighted values of the pixels in the neighborhood of the corresponding input pixel, where the weighted value of a pixel is determined as a function (e.g., a sum) of the original value of the pixel and the corresponding weight in the structuring element.

Figure 2:
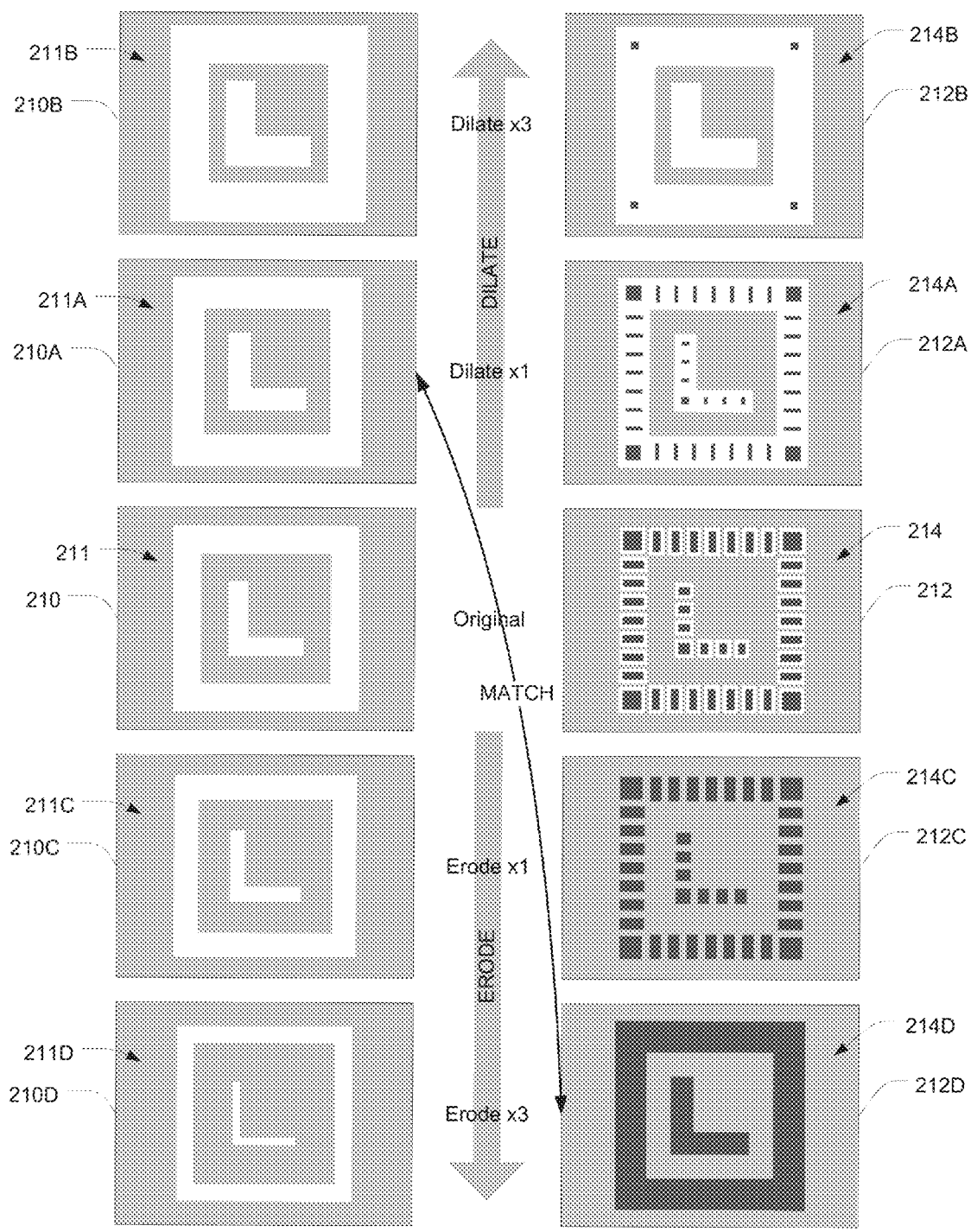
FIG. 2 illustrates results of morphological operations on two images in accordance with one embodiment.

Referring now to FIG. 2, two images to be compared are illustrated, a first image 210 and a second image 212. The first image 210 includes a first object 211 while the second image 212 includes a second object 214. The first image 210 and the second image 212 are being compared to determine whether the first object 211 and the second object 214 correspond to variant forms of a same object. Morphological operations are performed on the two images 210, 212. The original forms of the two images 210, 212 appear in the center of FIG. 2. In FIG. 2, the results of the morphological operations performed on the first image 210 appear on the left while the results of the morphological operations performed on the second image 212 appear on the right. Further, the morphological operations applied to the images 210, 212 are dilations in the top half of FIG. 2 and erosions in the bottom half of FIG. 2.

The illustrated results of the morphological operations performed on the first image 210 include: a first image 210A following a single dilation operation using a structuring element of 3×3 pixels in size; a first image 210B following three successive dilation operations each using a structuring element of 3×3 pixels (or a single dilation operation using a structuring element of 7×7 pixels); a first image 210C following a single erosion operation using a structuring element of 3×3 pixels; and a first image 210D following three successive erosion operations each using a structuring element of 3×3 pixels (or a single erosion operation using a structuring element of 7×7 pixels). As a result of the processing, each of the first images 210A, 210B, 210C, 210D includes a first object 211A, 211B, 211C, 211D in a variant form as compared with the first object 211 (the original form) in the first image 210.

The illustrated results of the morphological operations performed on the second image 212 include: a second image 212A following a single dilation operation using a structuring element of 3×3 pixels in size; a second image 212B following three successive dilation operations each using a structuring element of 3×3 pixels (or a single dilation operation using a structuring element of 7×7 pixels); a second image 212C following a single erosion operation using a structuring element of 3×3 pixels; and a second image 212D following three successive erosion operations each using a structuring element of 3×3 pixels (or a single erosion operation using a structuring element of 7×7 pixels). As a result of the processing, each of the second images 212A, 212B, 212C, 212D includes a second object 214A, 214B, 214C, 214D in a variant form as compared with the second object 214 (the original form) in the second image 212.

In the illustrated example, without morphological processing, a comparison of the first image 210 and the second image 212 does not result in a match between the first object 211 and the second object 214 in their original forms. However, further to morphological processing, comparison of the set of first images 210, 210A, 210B, 210C, 210D and the set of second images 212, 212A, 212B, 212C, 212D (e.g., in pair-wise manner) results in match between the first image 210A and the second image 212D. More precisely, the first object 211A in its variant form matches the second object 214D in its variant form. As a result, further to morphological processing, it is determined that the first object 211 and the second object 214 in the images 210, 212 correspond to variant forms of a same object.

As illustrated in FIG. 2, morphological operations change the form of objects located in the images subject to the operations. Thus, a variant form of an object is created when the image in which the object is located is subject to one or more morphological operations. Various embodiments described herein perform morphological operations on either or both of model images and target images in an object recognition process to generate variant forms of objects included in the images.

Figure 3:
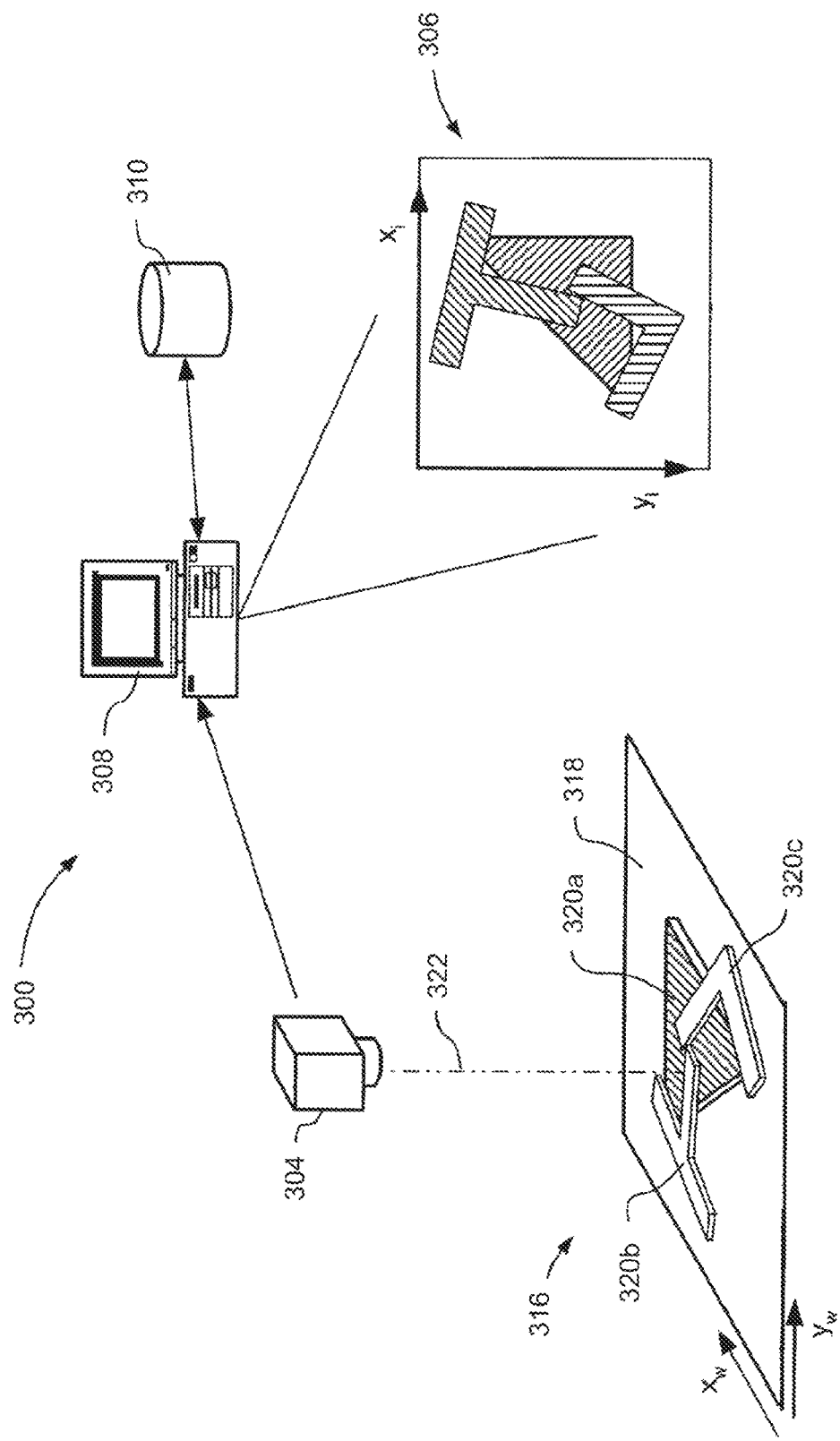
FIG. 3 illustrates a machine vision system in accordance with one embodiment.

Referring to FIG. 3, a machine vision system 300 is illustrated in accordance with one embodiment. In the illustrated embodiment, the system 300 includes an image acquisition device 304 for acquiring an image 306; an image processor 308 for analyzing the acquired image 306 (and, if desired, displaying the acquired image and/or any analysis results); and a database 310 containing model data concerning one or more models. The image processor 308 can be provided as any suitable combination of hardware and software, such as, for example, a suitably programmed computer or specialized industrial computer. The database 310 can be stored in memory included in the processor 308, or external to the processor 308 depending on the embodiment. Where the database 310 is stored at a location remote from the processor 308, the processor 308 can access the database 310 via a network (not shown).

The image acquisition device 304 is positioned to acquire an image of a desired field of view within a "world space" 316 of the system 300. This world space 316 can, for example, be defined within an inspection station (not shown) of a production line, in order to enable recognition and localization of objects passing through the inspection station. According to one embodiment, the image acquisition device 304 is a digital camera. However, other types of image acquisition devices (e.g., electro-magnetic imaging devices such as radar and nuclear magnetic resonance imaging systems; or ultra-sonic imaging systems etc.) can be employed depending on the embodiment. Further, the world space 316 may include a "world surface" 318 (which may be a physical or a virtual surface) providing a visual reference frame. Further, the world space 316 may have an associated "world coordinate system" ($x_w$, $y_w$).

In general, the system 300 operates to recognize objects 320 within the world space 316 (in this example, laying on the world surface 318). In the illustrated embodiment, the objects 320 include a triangular object 320a which is partially occluded by overlying objects 320b and 320c.

Processes described herein such as those described with reference to FIGS. 4-13C can be employed with the system 300 (or other object recognition systems) to recognize objects using morphologically-processed images. In some embodiments, the overall approach includes creating a model set for object recognition where the model set includes morphologically-processed model images. In these embodiments, the target image can also be subject to morphological processing. These processed target images are subject to object recognition to determine whether an image includes one or more candidate objects.

Figure 4:
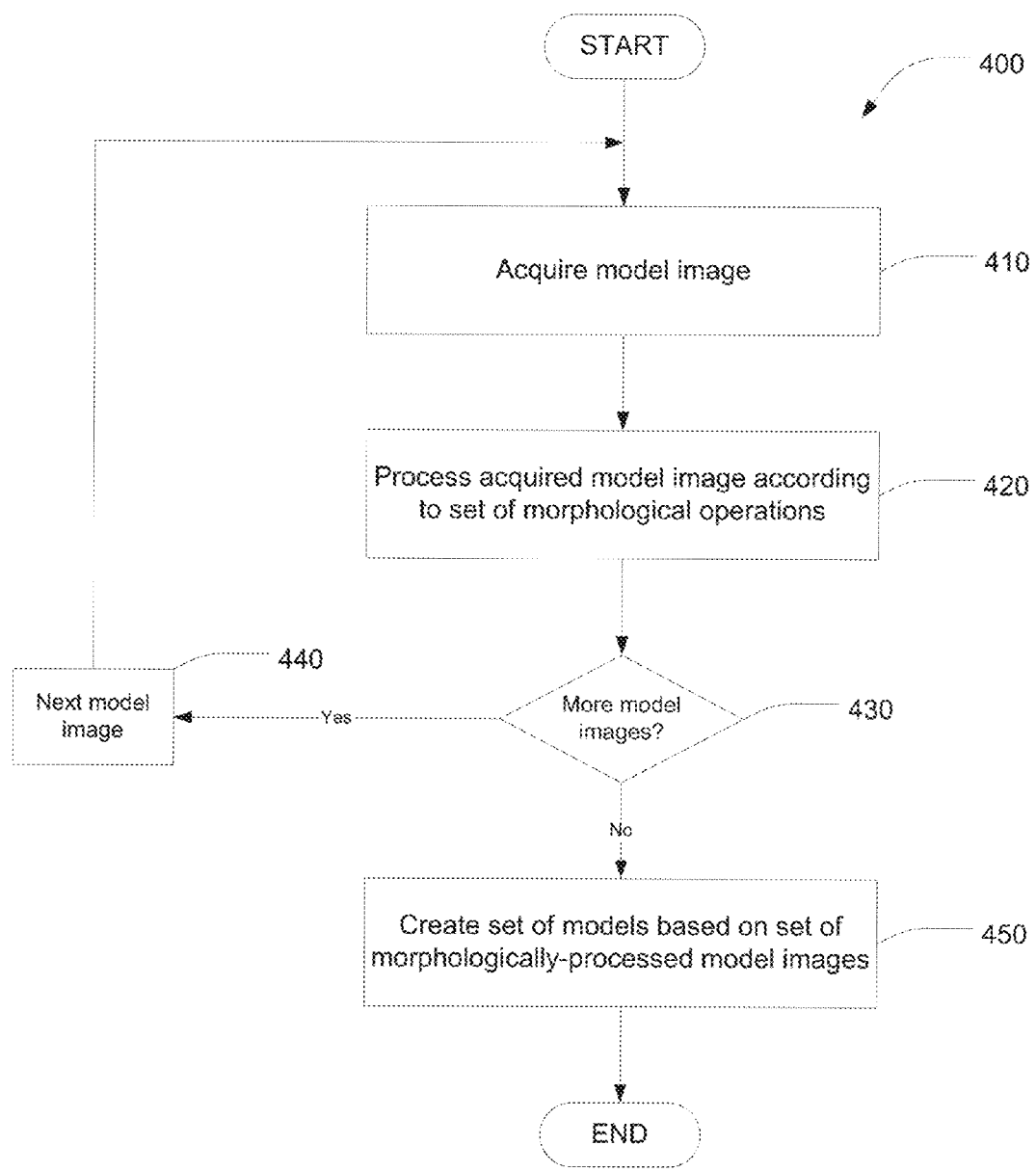
FIG. 4 illustrates a process for creating a model set in accordance with one embodiment.

Referring now to FIG. 4, a process 400 for creating a model set is illustrated in accordance with one embodiment. The process 400 begins at act 410 where a model image is acquired. The model image is an image of the object for which occurrences are to be recognized during the object recognition process. In various embodiments, the model image can be an image of an instance of the object acquired by a camera or other image acquisition device or a synthetic image output by a software application. In various embodiments, the model image can be a grayscale image or binary image. In some embodiments, the model image is derived from a color image.

At step 420, the acquired model image is processed according to a set of one or more morphological operations resulting in a set of one or more morphologically-processed model images, respectively. Each of the morphologically-processed model images provides a variant form of the object in the model image that can be used in the object recognition process. As will be detailed below, selection of the set of morphological operations can vary depending on the embodiment. In some embodiments, the set of morphological operations (e.g., number of operations and type) as well as the parameters related to a particular morphological operation (e.g., size and shape of a structuring element) are chosen based on the expected variations in the appearance of the object.

At act 430, the process is employed to determine whether any additional model images are to be processed according to the process 400. If there are additional model images to be processed, then another model image is selected at act 440. That model image is acquired at act 410 and processed according to a set of morphological operations at act 420. The additional model image can be an image of the "same" object (e.g., an image where the object takes a different form) or an image of an altogether different object to be recognized. The process returns to act 430 and repeats until no further model images are selected. At that point, the process moves from act 430 to act 450.

At act 450, a set of models is created based on the set of morphologically-processed model images obtained at act 420 and the process 400 ends. According to some embodiments, the set established at act 450 includes a plurality of models images each including a morphologically-processed object that provides a variant form of an object to be recognized. According to one embodiment, each model included in the set includes the same object. In other embodiments, the full set of models includes a plurality of objects with each morphologically-processed model image including a variant form of at least one of the objects. According to one embodiment, the original model image(s) are also included in the model set. According to still further embodiments, one or more models included in the model set include a set of features extracted from the morphologically-processed model image (or original model image.) For example, the features can be the coordinates of edge points, interest points or other local features.

Figure 5:
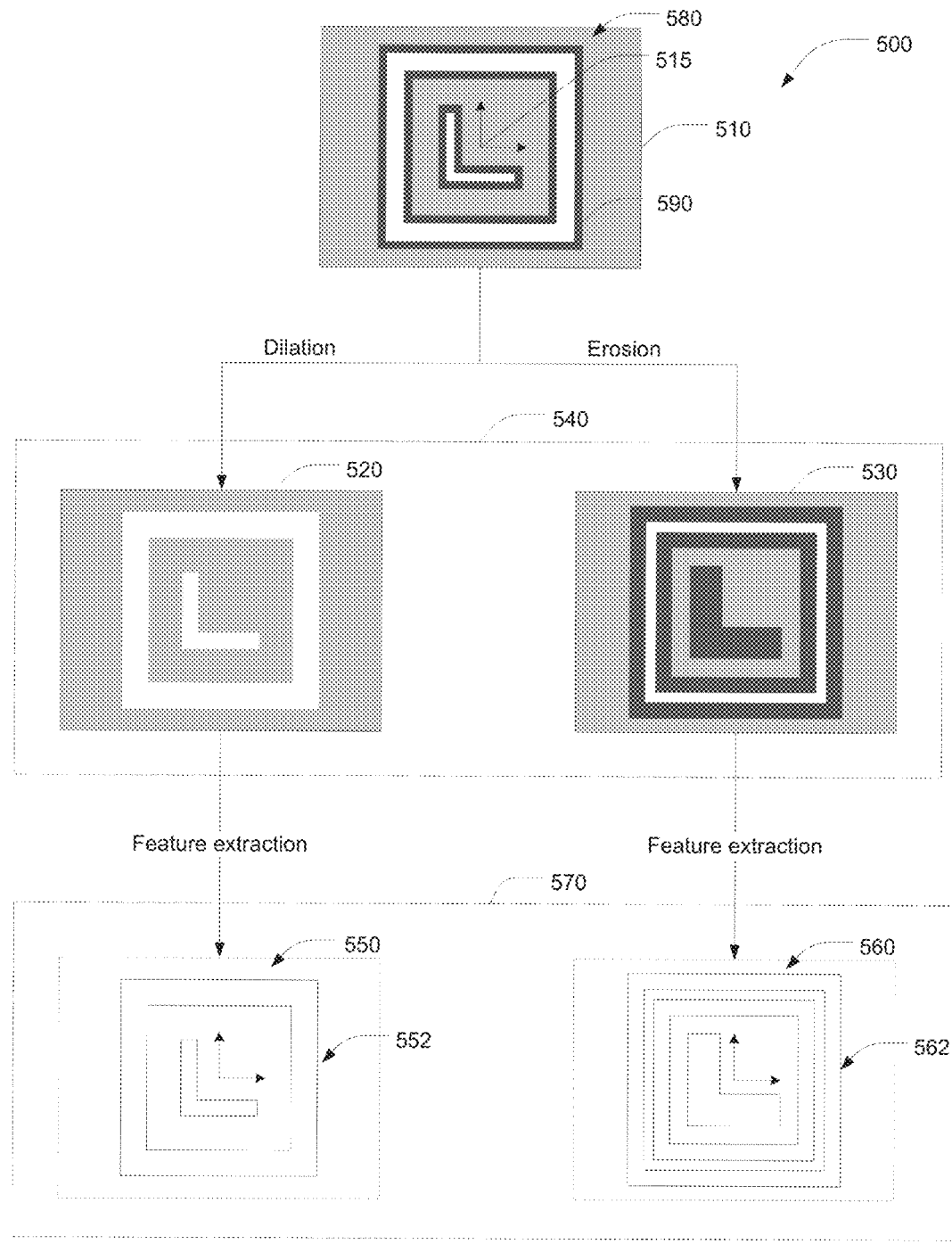
FIG. 5 illustrates a process including performing morphological operations on a model image in accordance with one embodiment.

FIG. 5 illustrates a process 500 in which a model set is created, in accordance with one embodiment. According to this embodiment, the process 500 begins with a model image 510, in this example, a grayscale model image, where the model image 510 includes an object 580 to be recognized. In the illustrated example, the object 580 has a general shape of a letter L at the center of a square frame. In the illustrated example, the square frame is included as a part of the object 580. Further, the object 580 appears as a solid object in a light color with a dark outline 590. According to this embodiment, the model image 510 has an associated model coordinate system 515.

Further, FIG. 5 illustrates the model image 510 subject to two different morphological operations to provide a set of models 540 for object recognition. The set of models 540 includes a first model image 520 and a second model image 530. A dilation operation performed on the model image 510 results in the first model image 520. An erosion operation performed on the model image 510 results in the second model image 530. In the illustrated example, the dilation operation removes the dark outline 590 around the object 580 to reach the "general shape" of the object. The erosion operation increases a thickness of the dark outline 590 around the object 580 to reach a different form of the object.

FIG. 5 also illustrates that a second model set 570 can be created including a third model 550 and a fourth model 560. According to this embodiment, an additional operation is employed on the two model images 520, 530 to provide the second model set 570. For example, in the illustrated embodiment, a first set of features 552 is extracted from the first model image 520 and a second set of features 562 is extracted from the second model image 530. Thus, each of the third model 550 and the fourth model 560 provides the respective feature set 552, 562 as the model. In various embodiments, the models 550, 560 can be employed for object recognition either alone, in combination with the models 520, 530 or in combination with other models. According to the illustrated embodiment, the features are the coordinates of edge points.

Figure 6:
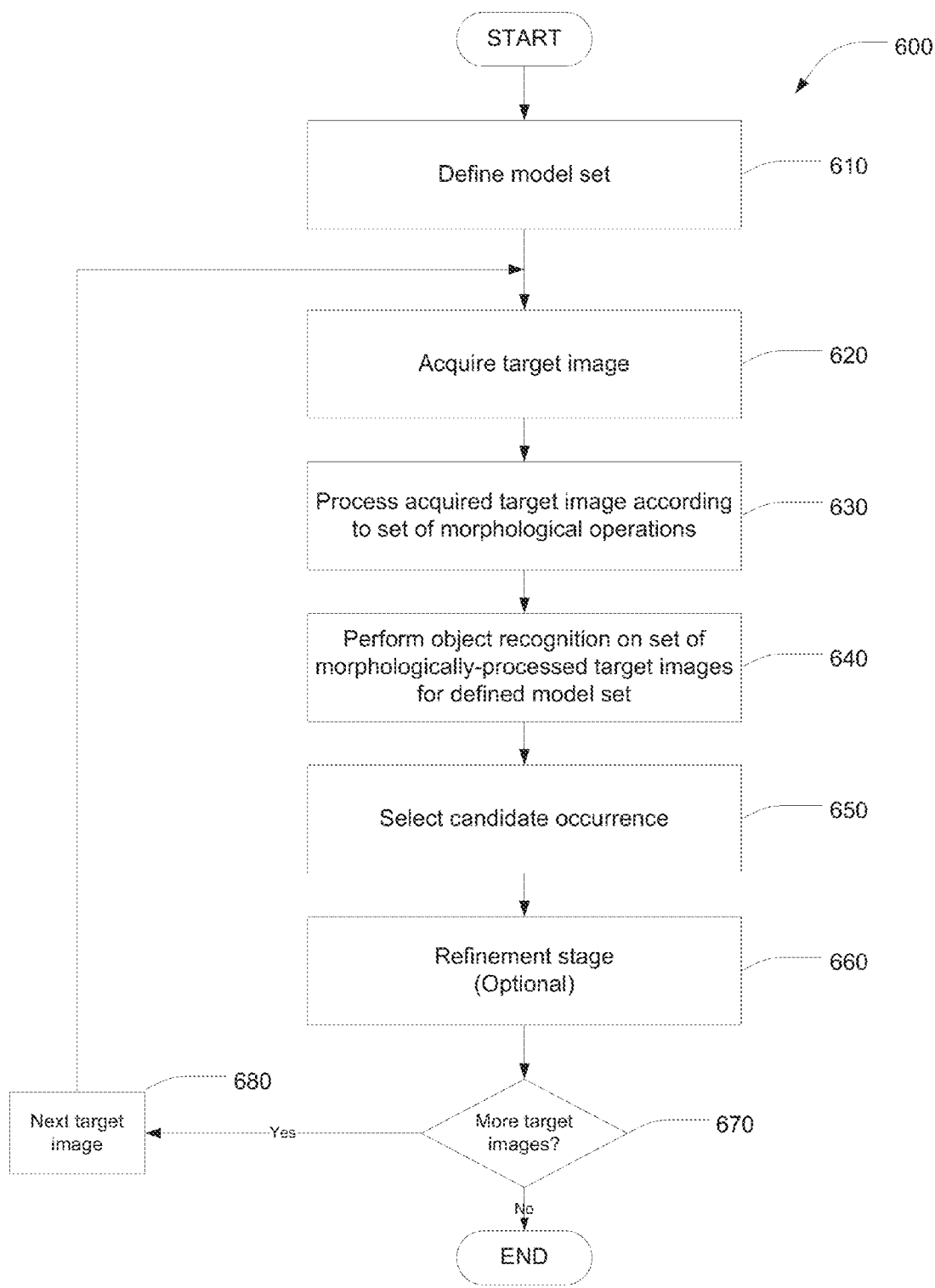
FIG. 6 illustrates a process for object recognition in accordance with one embodiment.

Referring now to FIG. 6, a process 600 of object recognition is illustrated in accordance with some embodiments. In general, the process 600 identifies, in a target image, a candidate occurrence of a model of a defined model set by comparing a morphologically-processed target image with a model included in the model set. The process 600 begins at act 610 where a model set is defined. According to one embodiment, the act 610 includes the process 400 to generate the model set. Alternatively, a model set established using an alternate process can be selected.

At step 620, a target image is acquired. According to various embodiments, a target image can be a grayscale image or binary image. In some embodiments, a target image can be derived from a color image. Generally, a target image includes at least one object to be recognized during the object recognition process. According to one embodiment, the target image is acquired by a machine vision system such as the machine vision system 300 illustrated in FIG. 3. According to this embodiment, the image can be acquired by a camera or other image acquisition hardware included in the system 300.

At act 630, the acquired target image is processed according to a set of one or more morphological operations to obtain a set of one or more morphologically-processed target images, respectively. Generally, each of the morphologically-processed target images provides a variant form of the object(s) in the target image. In some embodiments, the set of morphological operations applied to the target image at step 630 is the same set of morphological operations as applied to the model image at step 420. In other embodiments, it is a different set of morphological operations. As will be detailed below, selection of the set of morphological operations can vary depending on the embodiment.

At act 640, object recognition is performed on the set of morphologically-processed target images for the defined model set. According to some embodiments, each of the morphologically-processed target images is analyzed at act 640 to locate occurrences of any of the models included in the defined model set. Further, for a given model and target image, the object recognition performed at act 640 produces a list of candidate occurrences of the model in the target image. For each candidate occurrence, associated data such as the position (and where applicable, the orientation and scale) of the occurrence of the model in the target image is provided along with a score indicating, for example, a degree of correspondence between the model (represented at the given position, orientation and scale) and the target image.

Depending on the embodiment, various object recognition (or pattern matching) techniques may be employed to recognize an occurrence of a given model in a given target image. According to some embodiments, the object recognition technique performed at act 640 extracts a set of features from the model, extracts a similar set of features from the target, and then determines associations between the model and target feature sets. For example, the set of features can be the coordinates of edge points, interest points or other local features. Accordingly, object recognition techniques based on geometric hashing, the Hough transform, or generalized Hough transform may be employed at act 640, as just some examples. In other embodiments, object recognition techniques that compare values of pixels in the target image with values of pixels in the model image such as normalized grayscale correlation may be employed.

At act 650, one or more candidate occurrences are selected based on the results provided at act 640. For example, the selected candidates can be the candidates with the highest scores or the candidates whose score is above a predefined threshold depending on the embodiment. According to some embodiments, the processing of the current target image is complete at act 650. According to these embodiments, data concerning the selected candidate occurrence(s) can be stored, transmitted and/or displayed to the user.

According to other embodiments, at act 660, a refinement stage is performed following act 650. According to further embodiments, the act 660 is optional. In general, the act 660 is employed to improve the accuracy of object recognition by varying the nature of the morphological operations performed on either or both of the model and target images. For example, according to some embodiments, a different set of morphological operations is applied to the model image and/or target image and object recognition is repeated. According to other embodiments, at act 660, object recognition is limited to an area of the target image(s) around the selected candidate occurrence(s).

At act 670, if there are more target images to be processed, steps 620-650 (and optionally 660) are repeated for the next target image. When all the subject target images have been acquired and processed the process 600 ends.

Figure 7:
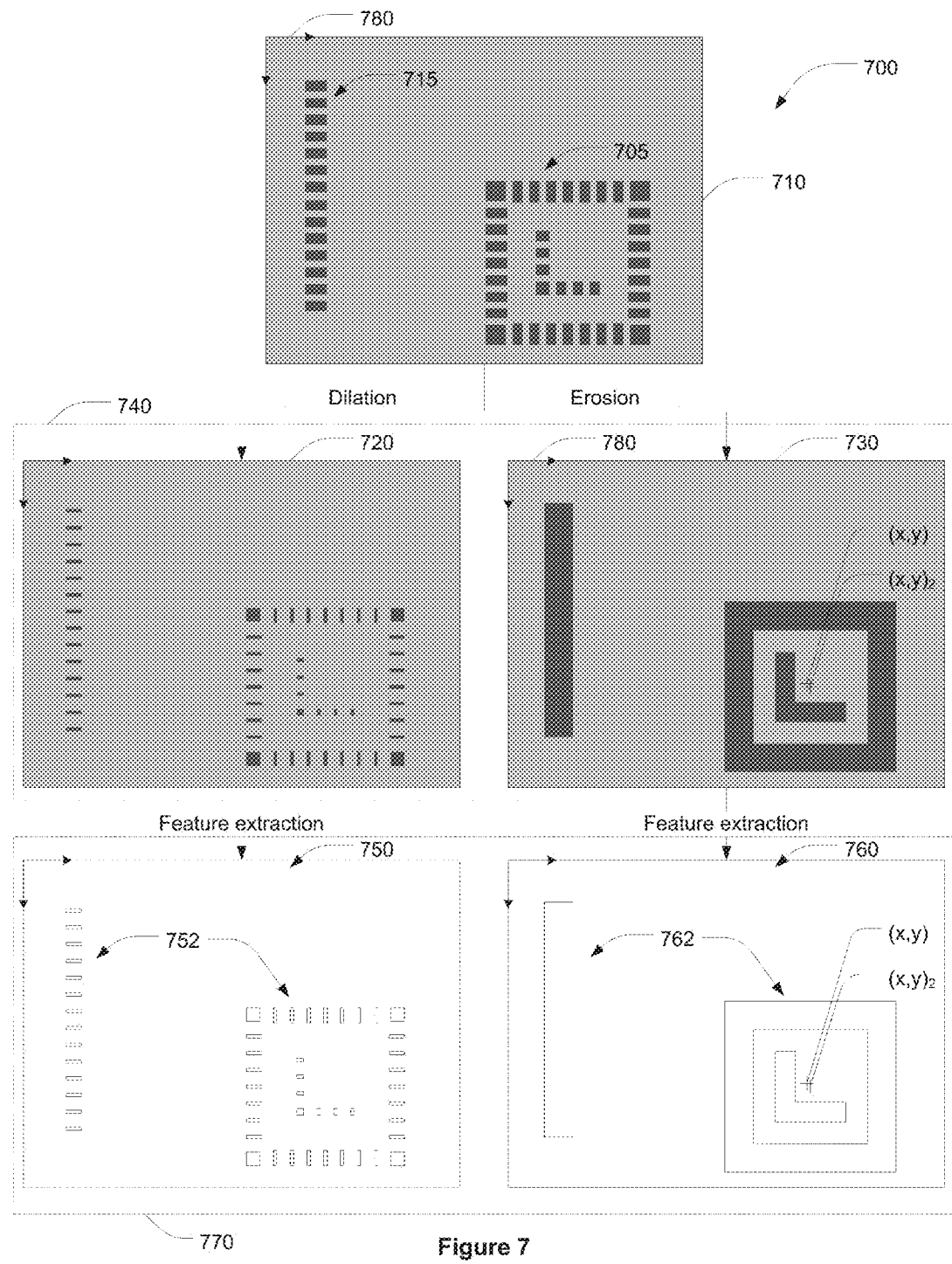
FIG. 7 illustrates a process including performing morphological operations on a target image in accordance with one embodiment.

FIG. 7 illustrates a process 700 in which a set of morphologically-processed target images are created and features extracted. In the illustrated embodiment, the process 700 begins with a target image 710, in this example, a grayscale target image. According to this embodiment, the target image 710 includes a first collection of objects 705 and a second collection of objects 715. Further, the target image 710 has an associated target coordinate system 780. According to the illustrated embodiment, the process 700 provides morphologically-processed target images for use in an object recognition process, for example, an object recognition process also employing the first set of models 540 or the second set of models 570 of FIG. 5.

FIG. 7 illustrates the target image 710 subject to two different morphological operations to provide a first set of targets 740 for object recognition. The first set of targets 740 includes a dilated target image 720 and an eroded target image 730. A dilation operation performed on the target image 710 results in a first target, the dilated target image 720. An erosion operation performed on the target image 710 results in a second target, the eroded target image 730. In the illustrated example, the dilation operation reduces the thickness of the objects included in each of the first collection of object 705 and the second collection of objects 715, respectively. However, the erosion operation acts to merge the first collection of objects 705 resulting in a "general shape" of the object ("L centered in box") that is the subject of the object recognition process.

FIG. 7 also illustrates that a second set of targets 770 can be created including a third target 750 and a fourth target 760. According to this embodiment, an additional operation is employed on the two target images 720, 730. For example, in the illustrated embodiment, a first set of features 752 is extracted from the first target image 720 to create the third target 750. A second set of features 762 is extracted from the second target image 730 to create the fourth target 760. Thus, each of the third target 750 and the fourth target 760 provides a respective feature set 752, 762 that can be compared with feature sets included in the models. According to the illustrated embodiment, the features are the coordinates of edge points.

According to this embodiment, object recognition is performed on a model-target pair by determining associations between edge points extracted from the model image (552 or 562) and edge points extracted from the target image (752 or 762). In the example illustrated in FIG. 7, associations are determined between the edge points extracted from model 520 (the first set of features 552) and the edge points extracted from eroded target image 730 (the second set of features 762). The result of this processing returns a candidate occurrence of model 520 at position (x,y) in the eroded target image 730. Thus, the variant form of the first collection of objects 705 provided by the eroded version of the target image 710 most closely matches an appearance of the dilated version of the object 580 included in the model image 510. According to one embodiment, the selection of a candidate occurrence as described here is included in act 650 of the process 600 illustrated in FIG. 6.

Figure 8:
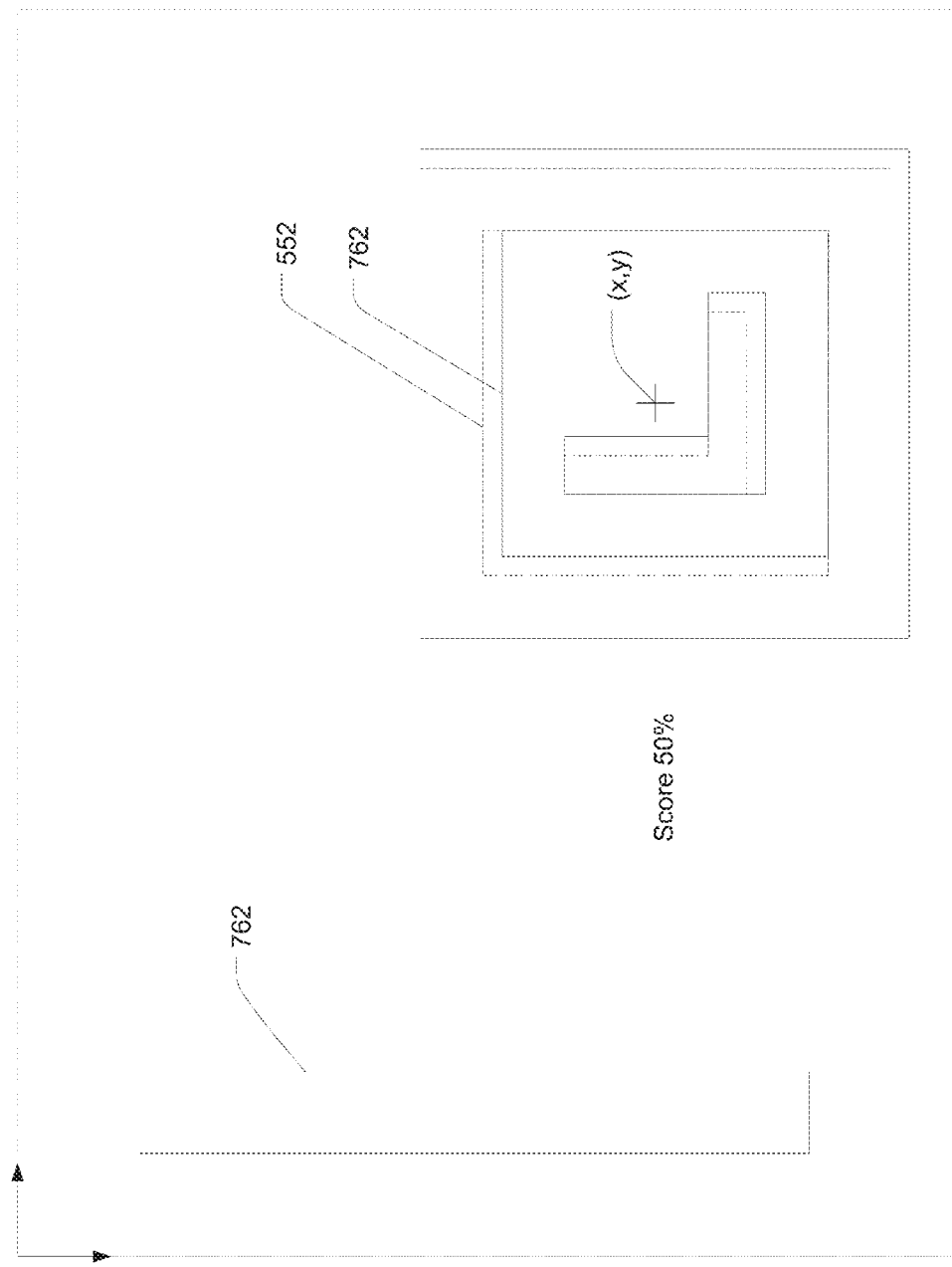
FIG. 8 illustrates further object recognition operations performed on the images of FIGS. 5 and 7 in accordance with one embodiment.

In various embodiments, an object recognition process includes the approach illustrated in FIG. 8 to further evaluate the candidate occurrence, for example, by providing a score or other quantified result from the processing of the candidate occurrence. In FIG. 8, the edge points included in the first set of features 552 are overlaid on the edge points included in the second set of features 762. The two feature sets are centered at a position with coordinates (x,y), at an angle of 0, and at a scale of 1. In this example, the score measures the proportion of the edge points of the model (represented at position (x,y), at an angle of 0, and at a scale of 1) that align with edge points in the target image within a tolerance. Here, for a tolerance of zero, the score of this candidate occurrence is approximately 50%.

Figure 9:
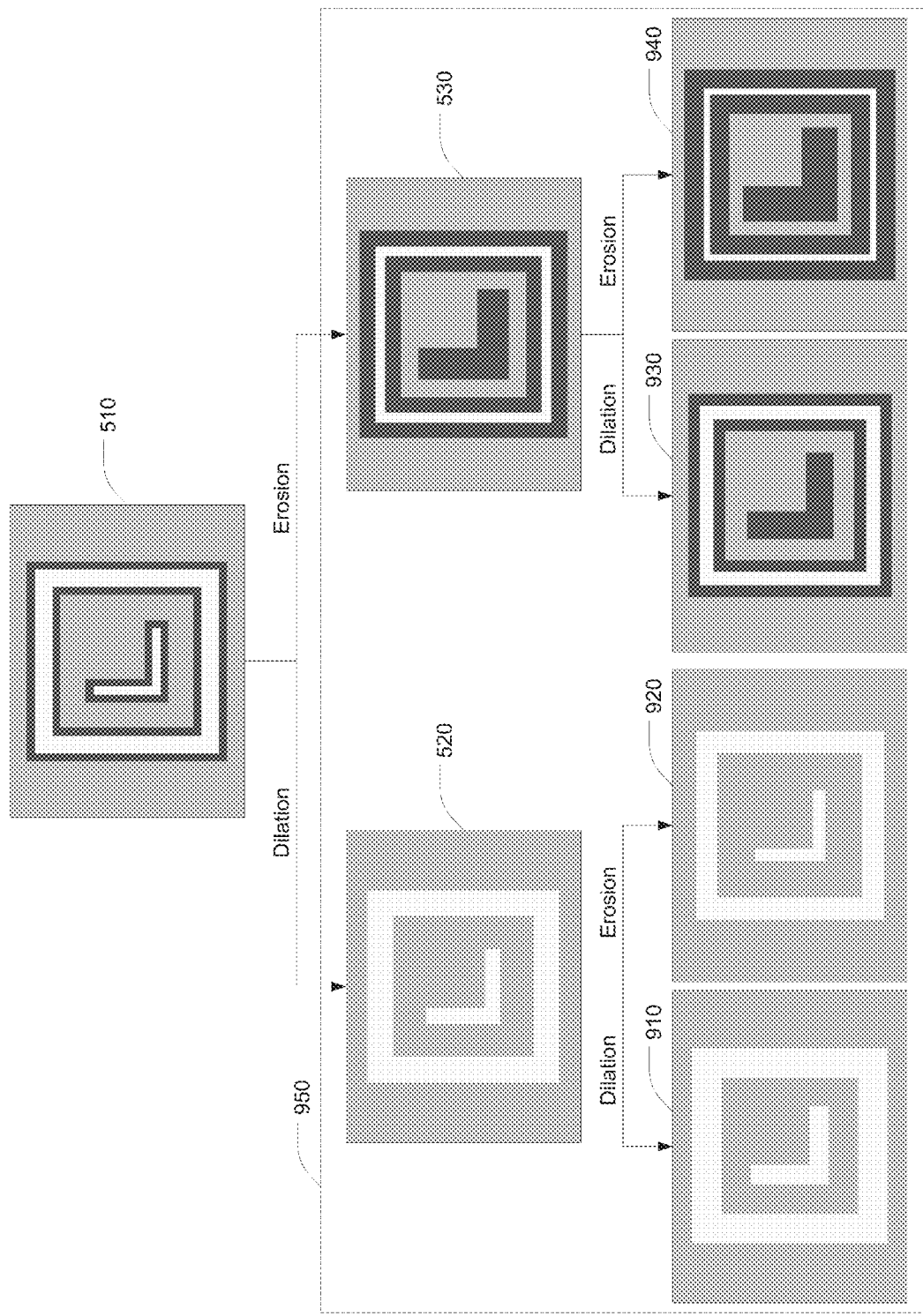
FIG. 9 illustrates a process for creating a model set for a refinement stage in accordance with one embodiment.

In further embodiments, a refinement process can be applied to improve the accuracy of the overall object recognition, for example, as described above concerning act 660 included in the process 600. According to some embodiments, the refinement process employs a model set that includes a larger quantity of models for object recognition. FIG. 9 illustrates one such process in which a new set of morphologically-processed model images are created for a refinement stage. According to the illustrated embodiment, a new set of models 950 is created from the model image 510 (originally illustrated in FIG. 5) for the refinement stage. According to this embodiment, the set of models 950 includes the dilated model image 520, the eroded model image 530 and additional models each resulting from performing a morphological operation or successive morphological operations on the model image 510 of FIG. 5.

The set of models 950 includes the dilated model image 520, the eroded model image 530 of FIG. 5, and additional model images: a fifth model image 910, a sixth model image 920, a seventh model image 930 and an eight model image 940. Each of the additional model images 910-940 is a morphologically-processed version of one of the dilated model image 520 and the eroded model image 530, respectively. According to the illustrated embodiment, the fifth model image 910 is a result of a dilation operation being performed on the dilated model image 520, the sixth model is a result of an erosion operation being performed on the dilated model image 520, the seventh model image 930 is a result of a dilation operation on the eroded model image 530, and the eighth model image 940 is a result of an erosion operation on the eroded model image 530. When compared with the model set 540, the model set 950 includes four additional variant forms for use in an object recognition process.

In one embodiment, object recognition is performed on the dilated target image 720 and on the eroded target image 730 of FIG. 7 for the new set of models 950 following an initial object recognition process that employed the model set 540. According to a further embodiment, the efficiency of the object recognition process is improved by employing the process on only a limited region of the target image. For example, rather than performing the process on the entire target image, the process can be performed in a region of the target image around the previously-located candidate occurrence at (x,y).

For illustrative purposes, a position located at coordinates (x,y)2 in the fourth target 760 is referred to here. Thus, the object recognition process illustrated in FIG. 9 is employed to locate a candidate occurrence of the fifth model 910 in the eroded target image 730 at the coordinates (x,y)2. The candidate occurrence is located at an angle of 0, and at scale of 1. According to one embodiment, a score can be determined for the candidate occurrence based on a given set of features in each of the fifth model image 910 and the eroded target image 730, respectively.

Figure 10:
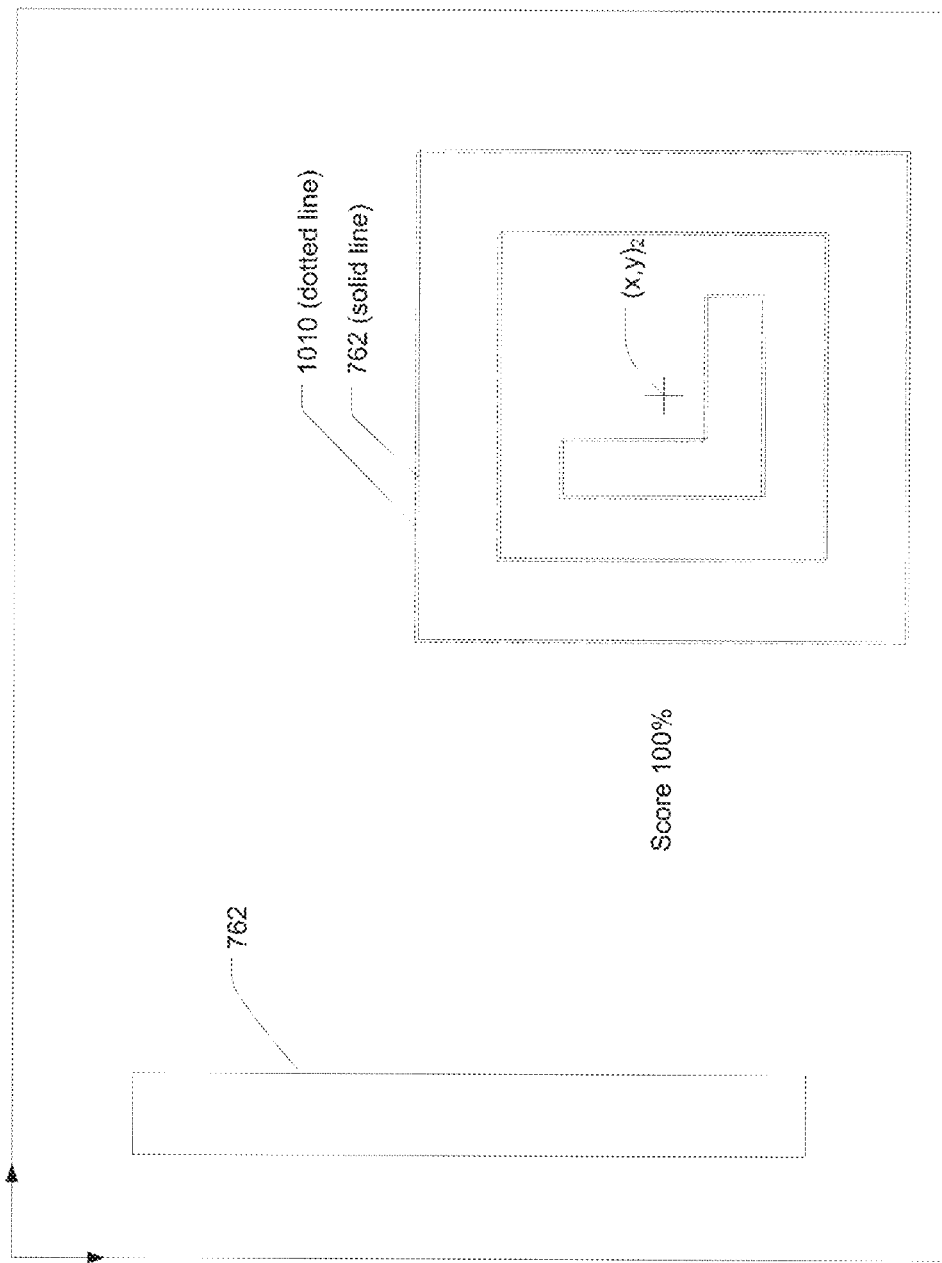
FIG. 10 illustrates further object recognition operations performed on the images of FIGS. 7 and 9 in accordance with one embodiment.

For example, in FIG. 10, the edge points included in a fifth set of features 1010 extracted from the fifth model 910 are overlaid on the edge points included in the second set of features 762 extracted from the fourth target image 730. The two feature sets are centered at the location of the candidate occurrence at a position with coordinates (x,y)2, at an angle of 0, and at a scale of 1. In this example, the score measures the proportion of the edge points of the model (represented at position (x,y)2, at an angle of 0, and at a scale of 1) that align with edge points in the target image within a tolerance. The candidate occurrence has an improved score of 100% in this example.

According to some embodiments, a fractional morphological approach is employed with the processes described herein. In general, a fractional morphological approach may be generalized as performing a morphological operation by a factor of M/N.

Figure 11A:
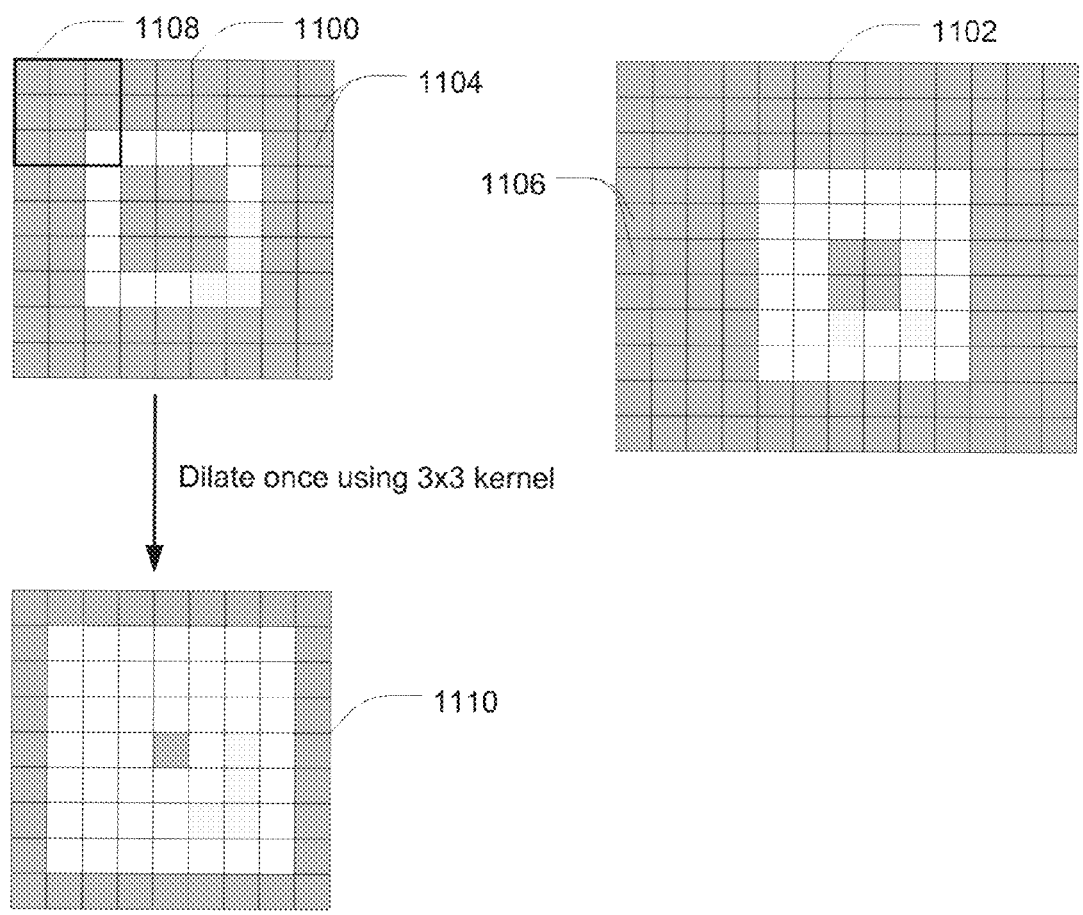
FIG. 11A illustrates a morphological operation performed in accordance with a further embodiment.
Figure 11B:
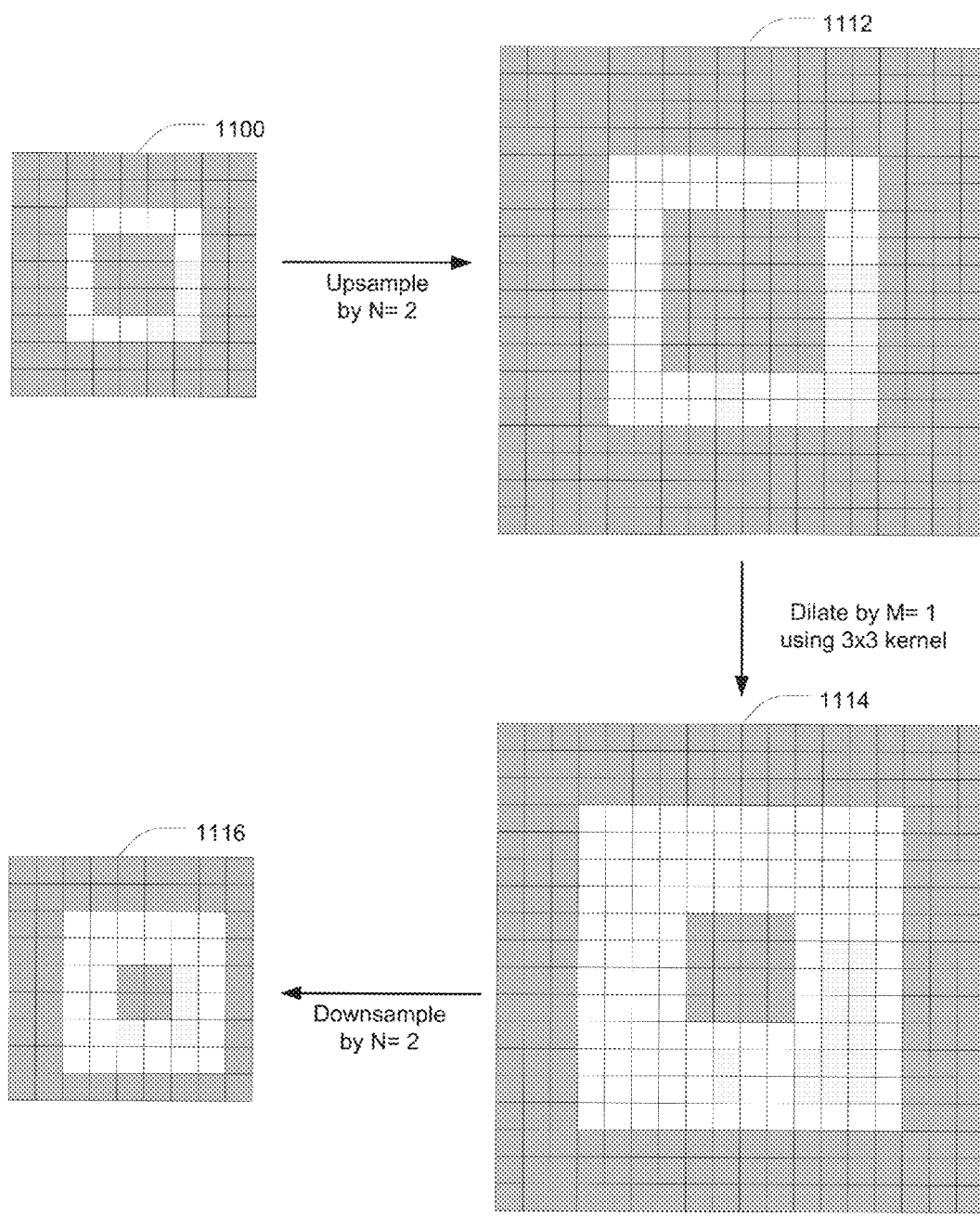
FIG. 11B illustrates a morphological operation performed in accordance with another embodiment.

In some situations, such as during a refinement stage, it may be desirable to apply such a fractional morphological operation, for example, as illustrated in the embodiment shown in FIGS. 11A and 11B. In the example illustrated in FIG. 11A, object recognition is being performed between a model image 1100 and a target image 1102. The model image 1100 and target image 1102 are composed of pixels 1104 and 1106, respectively.

Without a morphological operation being performed, the model image 1100 and target image 1102 do not match or match with a less than perfect score (depending on the tolerance level of the score and threshold for match, for example). Here, the model image 1100 is dilated by a factor of 1 (i.e., dilated once) using a square structuring element (or kernel) 1108 of 3 pixels by 3 pixels to produce a dilated model image 1110. Still, however, the dilated model image 1110 and target image 1102 do not match or match with a less than perfect score. In particular, the object in the original model image 1100 is not thick enough (not dilated enough) to match the object in the target image 1102, while the object in the dilated model image 1110 is too thick (too dilated). In this case, a perfect match can be achieved but it is necessary to first dilate the model image 1100 by a factor of ½ (one half).

As explained in detail with reference to FIG. 11B, a morphological operation is performed using a factor of M/N. In the illustrated embodiment, a process for performing a dilation operation by a factor of ½ is illustrated. FIG. 11B illustrates the model image 1100, an upsampled model image 1112, a dilated model image 1114 and a downsampled model image 1116. According to the illustrated embodiment, the model image 1100 of FIG. 11A is first upsampled (scaled up) by a factor of N=2 to obtain the upsampled model image 1112. Then, the upsampled model image 1112 is dilated by a factor of M=1 (i.e., is dilated once) using a square structuring element of 3 pixels by 3 pixels (as in FIG. 11A) to obtain the dilated model image 1114. Finally, the dilated model image 1114 is downsampled (scaled down) by a factor of N=2 to obtain a downsampled model image 1116. The object recognition between the downsampled model image 1116 (which corresponds to the original model image 1100 dilated by a factor of ½) and the target image 1102 of FIG. 11A results in a perfect match.

The processes illustrated in FIG. 11B can generally be described by the following acts, where the values of M and N are determined for a particular embodiment. First, the model image is upsampled by an integer factor of N to obtain an upsampled model image. Then, the upsampled model image is morphologically-processed by an integer factor of M to obtain a morphologically-processed model image. (For example, the morphological operation may be applied M times or, alternatively, a single morphological operation using a suitably larger structuring element may be applied.) Finally, the morphologically-processed model image is downsampled by the same factor of N to obtain a downsampled model image. The downsampled model image (which corresponds to the original model image morphologically-processed by a factor of M/N) is compared to the target image.

Although FIG. 11B is illustrated and described with reference to a downsampling process using a nearest neighbor interpolation, downsampling can be performed by other interpolation methods. For example, depending on the embodiment, downsampling can be performed using bilinear interpolation, bicubic interpolation or other approaches.

In some embodiments, information is lost in the downsampling process. To avoid the loss of information, the target image may be upsampled by a factor of N rather than downsampling the morphologically-processed model image by a factor of N. In a case where the target image is upsampled, object recognition is performed between the upsampled then morphologically-processed model image and the upsampled target image. In the example illustrated by FIGS. 11A and 11B, the target image 1102 can be upsampled by a factor of N=2, and object recognition performed between the upsampled target image and the upsampled then dilated model image 1114.

According to further embodiments, the processes described herein include applying one or more masks to the model image during object recognition. Generally, applying a mask to an area of a model image during object recognition affects how the match score is determined and can be advantageous in some circumstances. For example, a mask may identify a "don't care" area to be disregarded during object recognition. Where a "don't care" area is identified, a degree of correspondence between the masked area of the model image and a corresponding area of the target image is not considered in determining the match score.

If object recognition is performed using a morphologically-processed model image or target image as described above, a mask defined based on the original model image may no longer mask the desired area or may mask an area that should not be masked. According to various embodiments, one or more of the following approaches are employed to address the preceding.

In various embodiments, a mask may take the form of a mask image.

In one embodiment, if the model image is processed according to a morphological operation, a mask image is processed according to a "corresponding" morphological operation. Depending on the embodiment, the corresponding morphological operation may be the same morphological operation or a different morphological operation. For example, this may depend on the polarity of the model image and of the mask image, respectively. Then, the morphologically-processed mask image is applied to the morphologically-processed model image during object recognition.

Further, where the model image is processed according to a set of morphological operations, a mask image may be processed according to a corresponding set of morphological operations. According to this embodiment, object recognition is performed for a given morphologically-processed model image using the respective morphologically-processed mask image.

In another embodiment, if the target image is processed according to a morphological operation, a mask image is processed according to a "corresponding" morphological operation. Depending on the embodiment, the corresponding morphological operation may be the same morphological operation or a different morphological operation. Then, object recognition is performed for the morphologically-processed target image using the morphologically-processed mask image.

Further, where the target image is processed according to a set of morphological operations, a mask image may be processed according to a corresponding set of morphological operations. According to this embodiment, object recognition is performed for a given morphologically-processed target image using the respective morphologically-processed mask image.

In other embodiments, a mask may take a form other than a mask image. In one embodiment, a mask may take the form of a set of parameters (e.g., a position, size and shape) defining the area to mask. In this case, the parameters of the area to mask may be modified (e.g., the size of the area may be modified) according to a morphological operation applied to the model image or target image.

In the case where multiple masks are employed during object recognition, the processes described above for a single mask may be repeated or otherwise adapted to support multiple masks.

Figure 12A:
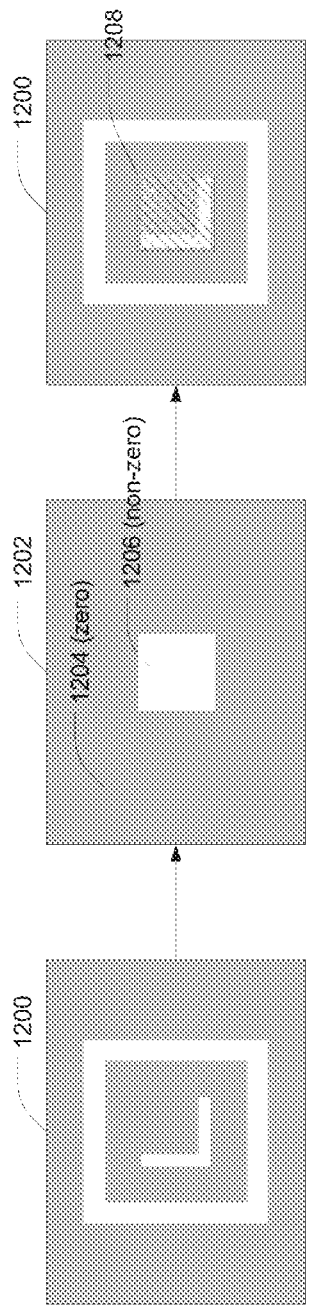
FIGS. 12A-12C illustrate examples in which a morphological operation is employed in accordance with some embodiments.
Figure 12B:
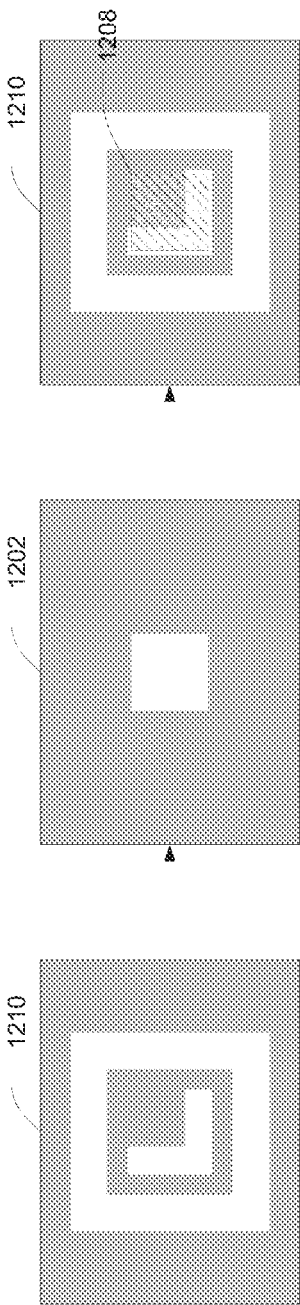
Figure 12C:
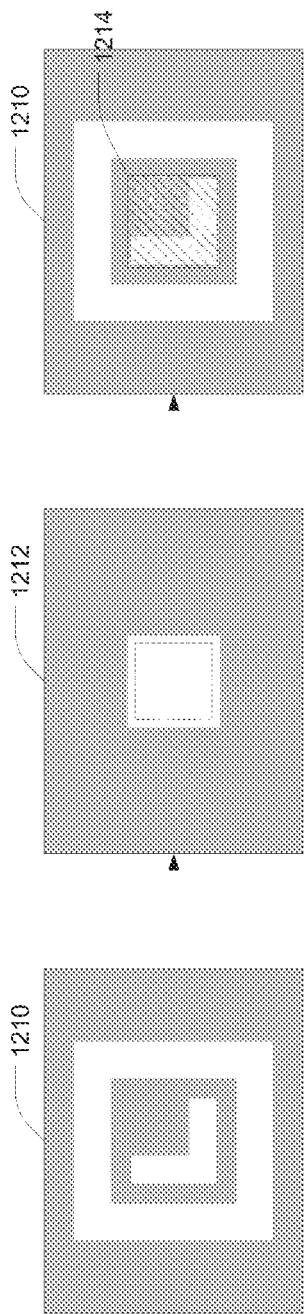

FIGS. 12A-12C illustrate examples in which a mask is employed in accordance with various embodiments.

FIG. 12A includes a model image 1200 and a mask image 1202. The mask image 1202 includes an area to mask 1206 and an unmasked area 1204. In the illustrated embodiment, the area to mask 1206 is selected to cover the L-shaped object in the model image 1200. In the illustrated embodiment, no morphological operation is applied to the model image 1200. During object recognition, the mask image 1202 is applied to the model image 1200. FIG. 12A also illustrates the model image 1200 showing the resulting masked area 1208. In the illustrated embodiment, the masked area 1208 of the model image 1200 includes the entire L-shaped object. The preceding provides the intended result of masking the entire L-shaped object in this example.

FIG. 12B includes a dilated model image 1210 and the original mask image 1202. Here, the model image 1200 is dilated to obtain the dilated model image 1210. In this example, the original mask image 1202 (defined based on the original model image 1200) is applied to the dilated model image 1210. In this example, the masked area 1208 in the dilated model image 1210 does not include the entire L-shaped object because the dilation operation applied to the model image 1200 has increased the object's thickness. The preceding does not provide the intended result of masking the entire L-shaped object in this example.

FIG. 12C illustrates the dilated model image 1210 and a dilated mask image 1212. According to the illustrated embodiment, the model image 1200 is dilated to obtain the dilated model image 1210. However, according to this embodiment, the mask image 1202 is also dilated to obtain the dilated mask image 1212. In the illustrated embodiment, the mask image 1202 is dilated by the same factor as the model image 1200 (e.g., using the same structuring element). When the dilated mask image 1212 is applied to the dilated model image 1210, the masked area 1214 includes the entire L-shaped object. The preceding provides the intended result of masking the entire L-shaped object in this example.

In the example of FIG. 12A-C, the unmasked area 1204 has a value of zero and the area to mask 1206 has a non-zero value. Thus, if the polarity of the mask image 1202 was reversed (i.e., the area to mask 1206 had a value of zero and the unmasked area 1204 had a non-zero value), in the embodiment of FIG. 12C, the mask image 1202 would have to be eroded by the same factor as the model image 1200 was dilated.

Figure 13A:
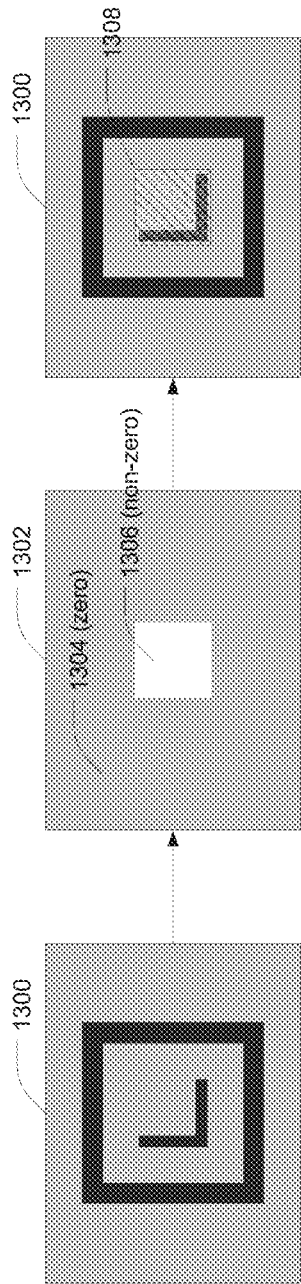
FIGS. 13A-13C illustrate examples in which a morphological operation is employed in accordance with still other embodiments.
Figure 13B:
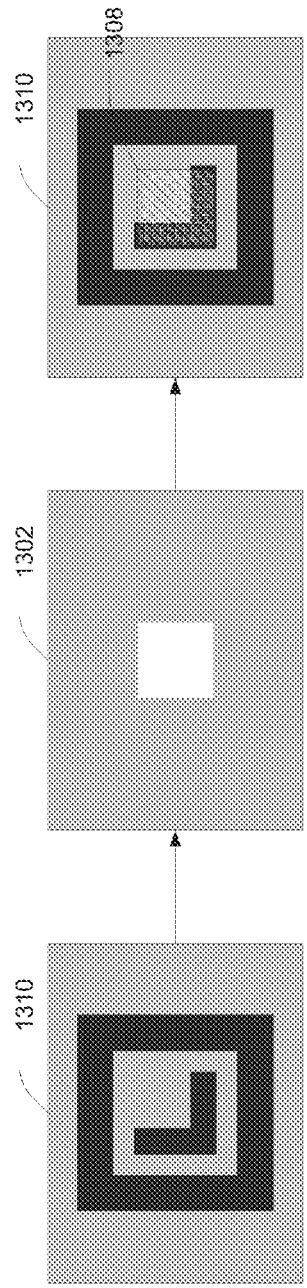
Figure 13C:
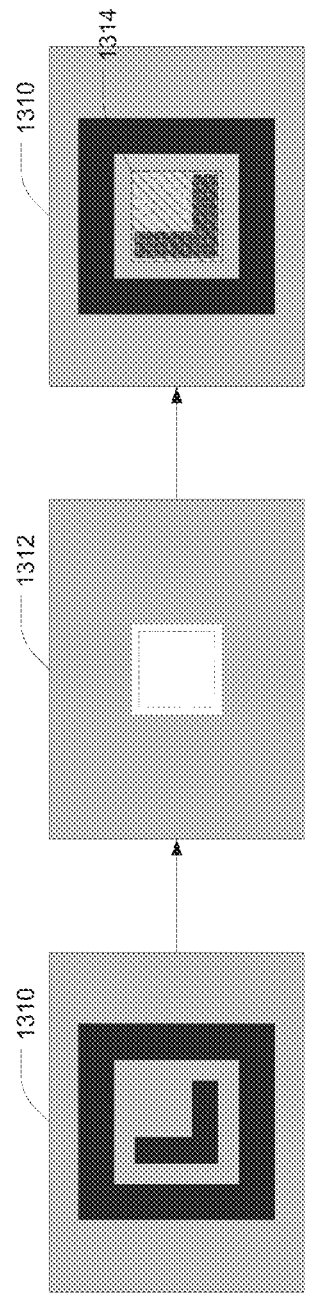

FIGS. 13A-C illustrate examples of a mask employed in accordance with various embodiments in which the polarity of the model image is reversed.

FIG. 13A includes a model image 1300 and a mask image 1302. The mask image 1302 includes an area to mask 1306 and an unmasked area 1304. In the illustrated embodiment, the area to mask 1306 is selected to cover the L-shaped object in the model image 1300. In the illustrated embodiment, no morphological operation is applied to the model image 1300. During object recognition, the mask image 1302 is applied to the model image 1300. FIG. 13A also illustrates the model image 1300 showing the resulting masked area 1308. In the illustrated embodiment, the masked area 1308 of the model image 1300 includes the entire L-shaped object. The preceding provides the intended result of masking the entire L-shaped object in this example.

FIG. 13B includes an eroded model image 1310 and the original mask image 1302. Here, the model image 1300 is eroded to obtain the eroded model image 1310. In this example, the original mask image 1302 (defined based on the original model image 1300) is applied to the eroded model image 1310. In this example, the masked area 1308 in the eroded model image 1310 does not include the entire L-shaped object because the erosion operation applied to the model image 1300 has increased the object's thickness. The preceding does not provide the intended result of masking the entire L-shaped object in this example.

FIG. 13C illustrates the eroded model image 1310 and a dilated mask image 1312. According to the illustrated embodiment, the model image 1300 is eroded to obtain the eroded model image 1310. However, according to this embodiment, the mask image 1302 is dilated to obtain the dilated mask image 1312. In the illustrated embodiment, the mask image 1302 is dilated by the same factor as the model image 1300 is eroded (e.g., using the same structuring element). When the dilated mask image 1312 is applied to the eroded model image 1310, the masked area 1314 includes the entire L-shaped object. The preceding provides the intended result of masking the entire L-shaped object in this example.

Although described with reference to dilation and erosion, the processes described herein can be employed with other morphological operations either alone, in combination with one another or in combination with dilation and erosion.

In some embodiments, the processes described herein a) process a target image according to a set of morphological operations to obtain a set of morphologically-processed target images and b) perform object recognition on the set of morphologically-processed target images for a model. According to these embodiments, the objective is to obtain a match between at least one of the morphologically-processed target images and the model provided the target image includes an occurrence of the model.

In other embodiments, the processes described herein a) process a model image according to a set of morphological operations to obtain a set of morphologically-processed model images, b) process a target image according to a set of morphological operations to obtain a set of morphologically-processed target images, and c) perform object recognition between the set of morphologically-processed target images and the set of morphologically-processed model images. According to these embodiments, the objective is to obtain a match between at least one of the morphologically-processed target images and at least one of the morphologically-processed model images provided the target image includes an occurrence of the object depicted in the model image.

Accordingly, in some embodiments, the set of morphological operations applied to the target image should be selected such that variations in the appearance of the object in the target image are removed or reduced relative to the model and/or one of the morphologically-processed model images. Similarly, where applicable, the set of morphological operations to apply to the model image should be selected such that variations in the appearance of the object in the model image are removed or reduced relative to the target and/or one of the morphologically-processed target images. The preceding approach can improve the ability to find a match between the target image or one of the morphologically-processed target images and the model (or one of the morphologically-processed model images). Thus, according to these embodiments, a selection of one or more morphological operations employed in the object recognition process can be tailored to improve the robustness, accuracy and/or speed of the object recognition process.

According to some embodiments, the set of morphological operations applied to the target image is selected based on the expected variations in the appearance of the object in the target image. In further embodiments, the set of morphological operations applied to the target image can be selected based on additional criteria. For example, the set of morphological operations applied to the target image can also be selected to help distinguish an occurrence of a model from other objects appearing in the target image. The preceding provides one or more variant target-forms of the object subject to the recognition process.

In embodiments where a set of morphological operations is applied to a model image, the set of morphological operations applied to the model image can be selected based on the expected variations in the appearance of the object in the model image. In some embodiments, the set of morphological operations applied to the model image can be selected based on other criteria. For example, the set of morphological operations applied to the model image can be selected based on the expected variations in the appearance of the object in the target image. The preceding provides one or more variant model-forms of the object subject to the recognition process.

According to some embodiments, the same set of morphological operations is applied to the model image(s) and the target image(s). In other embodiments, different sets of morphological operations are applied to the model and target images.

According to various embodiments, processes described herein include selecting a set of morphological operations using any one or more of the acts of: a) selecting a quantity of morphological operations to include in the set of morphological operations; b) selecting a type for a morphological operation included in the set of morphological operations; and c) selecting one or more parameters of a morphological operation included in the set of morphological operations.

Further, depending on the embodiment, the set of morphological operations may consist of: a single operation (e.g., a single dilation); multiple operations of the same type (e.g., multiple dilations); and multiple operations of different type (e.g., a single dilation and single erosion, multiple dilations and multiple erosions, etc.).

A morphological operation in the set of morphological operations may consist of, for example: a dilation operation; an erosion operation; an operation based on a dilation and/or erosion operation; a hit-or-miss operation; or an operation based on a hit-or-miss operation such as a thinning operation.

Examples of operations based on a dilation and/or erosion operation include: a close operation consisting of a dilation operation followed by an erosion operation using the same structuring element for both operations (i.e., the dilated image is eroded); an open operation consisting of an erosion operation followed by a dilation operation using the same structuring element for both operations (i.e., the eroded image is dilated); a dilation operation consisting of multiple consecutive dilation operations (i.e., the dilated image is dilated); and an erosion operation consisting of multiple consecutive erosion operations (i.e., the eroded image is eroded).

In some embodiments, the type of morphological operations to include in the set of morphological operations is selected based on the type of the expected variations in the appearance of the object in the model or target image. For example, in some embodiments, the set of morphological operations includes both a dilation operation and an erosion operation.

Figure 1:
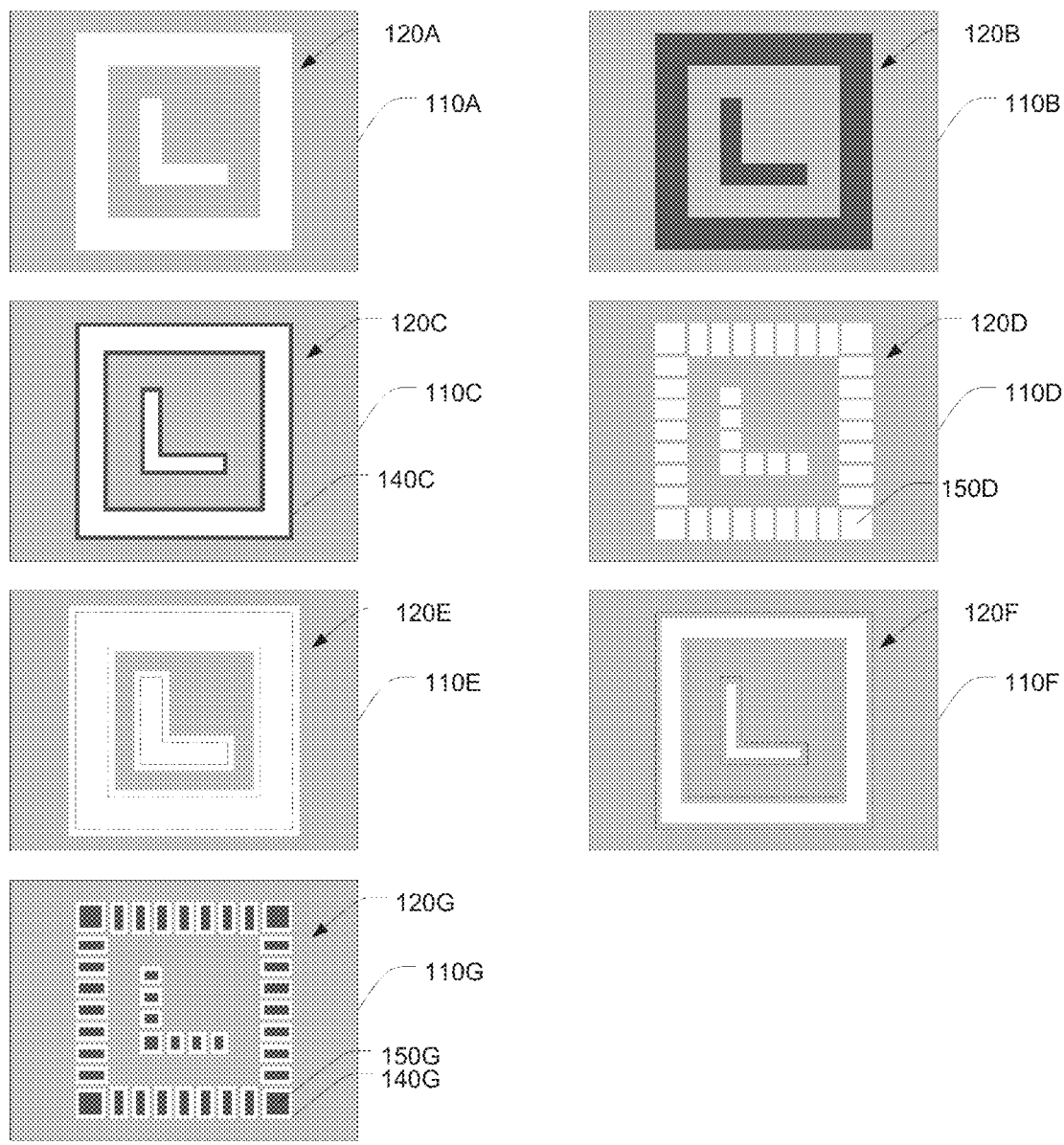
FIG. 1 illustrates variant forms of an object provided in a plurality of images.

A dilation operation can remove variations in the appearance of the object in cases where, for example, the object appears primarily in a lighter color and the variations in a darker color. In the example illustrated in FIG. 5, a dilation operation removes the dark outline 590 around the object 580. In the example illustrated in FIG. 1, performing a dilation operation on the image 110D can remove the darker gaps within the fragmented object 120D and performing a dilation operation on the image 110F can increase the thickness of thinner object 120F. In a further example, a dilation operation can also reduce the thickness of an object appearing in a darker color than the background.

According to various embodiments, an erosion operation can remove variations in the appearance of the object in cases where, for example, the object appears primarily in a darker color and the variations in a lighter color. In the example of FIG. 7, the erosion operation removes the lighter colored gaps within the fragmented object 705. In the example of FIG. 2 (second object 214), the first erosion operation removes the lighter colored outline from the object 214 to provide the object 214C, while the second erosion operation removes the lighter colored gaps within the object 214C to provide the object 214D. An erosion operation can also reduce the thickness of an object appearing in a lighter color than the background.

Generally, when the color of the object and the type of variations are not known in advance, performing both a dilation and an erosion increases the chance of removing variations in at least one of the morphologically-processed images.

Parameters of a morphological operation include the size and shape of the structuring element used for the morphological operation. Various embodiments can include an act of selecting the parameters of one or more morphological operations.

The size of the structuring element determines the degree of the morphological operation. For example, a greater degree of dilation can be achieved by selecting a larger structuring element for the dilation operation. A greater degree of dilation can also be achieved by performing consecutive dilation operations (i.e., the dilated image is dilated). According to various embodiments, either or both of the preceding approaches is employed in the object recognition process.

In some embodiments, the size of the structuring element (and/or the number of iterations of the morphological operation to perform) is selected based on the size of the expected variations of the object in the image. In the example of FIG. 5, if the dark outline 590 is 4 pixels wide, a single dilation operation using a structuring element of 5×5 or two successive dilation operations using a structuring element of 3×3 could be selected to remove the dark outline. In the example of FIG. 7, if the gaps within the fragmented object 705 are 4 pixels wide, a single erosion operation using a structuring element of 5×5 or two successive erosion operations using a structuring element of 3×3 could be used to close the gaps.

The shape of the structuring element of a morphological operation determines the topological and/or geometrical transformation applied to the image by the morphological operation.

In some embodiments, the shape of the structuring element is selected based on the characteristics (e.g., shape and direction) of the expected variations of the object in the image. For example, if the expected variations are not oriented in a particular direction, a circular structuring element (which is perfectly isotropic) may be selected. Alternatively, a square structuring element may be selected. In the examples provided by FIGS. 5 and 7, a square structuring element was selected. Further, if the expected variations are oriented in a particular direction, a suitable anisotropic structuring element may be selected.

A set of morphological operations can include one or more morphological operations. Accordingly, various embodiments of the processes described herein include selecting a number (i.e., quantity) of morphological operations to include in the set of morphological operations.

In some embodiments, the number of morphological operations included in the set of morphological operations is selected based on a range of the expected variations of the object in the image. For example, the range of the expected variations may be determined in terms of one or more of the type, size and characteristics (e.g., shape and direction) of the expected variations. Generally, a larger range of the expected variations requires a larger set of morphological operations.

For example, in embodiments where fewer types of variations are expected, fewer types of morphological operations can be included in the set of morphological operations (for example, the morphological operations may include only dilations or only erosions). Where more types of variations are expected, more types of morphological operations may be included in the set of morphological operations (for example, the morphological operations may include a combination of dilations, erosions and other types of morphological operations.)

For example, if the expected variations vary in size, multiple morphological operations using structuring elements of different sizes may be included in the set of morphological operations to remove the variations of different sizes.

According to another example, if the expected variations vary in their characteristics such as shape and/or direction, multiple morphological operations using structuring elements of different shapes may be included in the set of morphological operations.

Various embodiments of the approaches described herein can include a refinement stage employing a selected set of one or more morphological operations. In some embodiments, the refinement stage is performed following an initial object recognition stage used to locate one or more candidate occurrences. For example, in embodiments that include a refinement stage, a first set of morphological operations can be used for the initial object recognition stage and a second set of morphological operations can be used for the refinement stage. In some embodiments, the first set of morphological operations is selected to reduce variations in the appearance of the object allowing the identification of a candidate occurrence and the second set of morphological operations is selected to provide a fitting for the identified candidate occurrence. According to these embodiments, the fitting may yield a more accurate position and/or an improved score for the candidate occurrence.

In some embodiments, the second set of morphological operations (refinement) has a larger number of morphological operations than the first set of morphological operations (object recognition). In some embodiments, the second set of morphological operations (refinement) includes morphological operations with finer parameters (such as a smaller structuring element) than the first set of morphological operations (object recognition). In some embodiments, the second set of morphological operations (refinement) includes a "fractional" morphological operation.

The embodiments described herein are well suited to improve object recognition in a variety of applications. For example, these embodiments can be employed in a machine vision system for the fabrication or inspection of integrated circuits (IC) on semiconductor wafers. Such machine vision systems often must locate, in one or more target images of the wafer, the occurrence of an object, such as a part to be inspected or a fiducial marker (i.e., a pattern used as a reference point by automated assembly equipment.) In these applications, a model image of the object to be located is available. For example, the model image may be an image of the part output by IC layout software or an image of the fabricated part acquired by a camera. However, due to variations in the semiconductor device fabrication process, the fabricated part can vary significantly in appearance from one IC to another on the wafer, and therefore, from one occurrence to another in the target images. For example, the part can appear with reversed polarity, can appear with a more or less accentuated outline, can appear fragmented, can appear thicker or thinner, or can appear with a combination of such variations and/or other variations.

In these circumstances, embodiments described herein can be employed to efficiently recognize objects in target images despite the variations from IC to IC. Further approaches described herein are suitable to object recognition even where the variations are naturally occurring and unpredictable.

Processes described herein, such as those described with reference to FIGS. 3-13C can be employed with a variety of processing hardware depending on the embodiment. Thus, the apparatus, systems and methods described herein can be implemented using portable or stationary devices, including devices having a temporary or permanent fixed location. For example, embodiments of the apparatus, systems and methods described herein can be implemented using handheld devices such as mobile phones. Further, depending on the embodiment, all or a portion of the processes described herein can be implemented as a set of executable instructions on a computer readable medium.

Various aspects of the system 300 such as the application, and/or services described with reference to FIGS. 4-13C can be implemented as specialized software executing in a general purpose computing device such as a PC, a laptop, a tablet computer or other handheld computing device. The computing device can include, for example, a processor connected to one or more memory devices, such as a disk drive, flash drive, memory or other device for storing data. Depending on the embodiment, the computing device can communicate over hardwired or wireless communication interfaces with one or more other devices including, for example, the host system. Accordingly, any of the embodiments described herein can include a non-transitory computer readable medium in which instructions are stored that when executed by a processing system implement aspects described herein. Further, in some embodiments, the system 300 can employ cloud computing resources to connect resources remote from the image processor 308 and/or database 310.

Further, aspects can be implemented with a specially-programmed, special purpose hardware, for example, an application-specific integrated circuit (ASIC). Aspects of the invention can be implemented in software, hardware or firmware or any combination thereof. Such methods, acts, apparatus, systems, system elements and components thereof may be implemented as part of the computing system described above or as an independent component or components.

Although various embodiments described herein refer to "a set of morphologically-processed images," in some embodiments, a single image is employed and/or results from morphological processing. In some embodiments, the processes described herein employ the single image rather than a "set."

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for recognizing an occurrence of an object in an image, where the appearance of the object may vary from one occurrence to another, the method comprising:
    acquiring a target image;
    processing the target image according to a first set of morphological operations to obtain a set of morphologically-processed target images, the set of morphologically-processed target images including a plurality of morphologically-processed target images;
    defining a model set for object recognition including acts of:
        acquiring a model image;
        processing the model image according to a second set of morphological operations to obtain a set of morphologically-processed model images, the set of morphologically-processed model images including a plurality of morphologically-processed model images; and
        creating a model from each of the plurality of morphologically-processed model images, respectively;

performing object recognition on each of the morphologically-processed target images of the set of morphologically-processed target images for each of the models of the defined model set; and selecting at least one candidate occurrence of a model of the defined model set in the target image based on the object recognition performed on each of the morphologically-processed target images of the set of morphologically-processed target images.

2. The method of claim 1, further comprising selecting the first set of morphological operations based on expected variations in an appearance of the object in the target image.

3. The method of claim 2, wherein the act of selecting the first set of morphological operations includes at least one of the acts of:

selecting a quantity of morphological operations to include in the first set of morphological operations;

selecting at least one type of morphological operation to include in the first set of morphological operations; and selecting a parameter of a morphological operation included in the first set of morphological operations.

4. The method of claim 3, further comprising selecting the at least one type of morphological operation based on types of the expected variations in the appearance of the object in the target image.

5. The method of claim 3, further comprising selecting the quantity of morphological operations based on a range of the expected variations in the appearance of the object in the target image.

6. The method of claim 3, wherein the act of selecting the parameter of the morphological operation includes selecting at least one of a size and a shape of a structuring element of the morphological operation.

7. The method of claim 6, further comprising selecting the size of the structuring element based on a size of the expected variations in the appearance of the object in the target image.

8. The method of claim 6, further comprising selecting the shape of the structuring element based on at least one characteristic of the expected variations in the appearance of the object in the target image.

9. The method of claim 1, further comprising selecting the second set of morphological operations based on expected variations in an appearance of the object in the model image.

10. The method of claim 9, wherein the act of selecting the second set of morphological operations includes at least one of the acts of:

selecting a quantity of morphological operations to include in the second set of morphological operations;

selecting at least one type of morphological operation to include in the second set of morphological operations; and selecting a parameter of a morphological operation included in the second set of morphological operations.

11. The method of claim 10, further comprising selecting the at least one type of morphological operation based on types of expected variations in an appearance of the object in the model image.

12. The method of claim 10, further comprising selecting the quantity of morphological operations based on a range of the expected variations in the appearance of the object in the model image.

13. The method of claim 10, wherein the act of selecting the parameter of the morphological operation includes selecting at least one of a size and a shape of a structuring element of the morphological operation.

14. The method of claim 13, further comprising selecting the size of the structuring element based on a size of the expected variations in the appearance of the object in the model image.

15. The method of claim 13, further comprising selecting the shape of the structuring element based on at least one characteristic of the expected variations in the appearance of the object in the model image.

16. The method of claim 1, further comprising performing a refinement stage by:

defining a second model set for the refinement stage by processing the model image according to a third set of morphological operations to obtain a second set of morphologically-processed model images, and creating a model from each morphologically-processed model image included in the second set of morphologically-processed model images, respectively; and performing object recognition on the set of morphologically-processed target images for the second model set only for regions of the target image around the at least one selected candidate occurrence.

17. The method of claim 16, wherein the third set of morphological operations includes a larger number of morphological operations than the second set of morphological operations.

18. The method of claim 16, wherein the third set of morphological operations employs finer parameters than the second set of morphological operations.

19. The method of claim 18, wherein the third set of morphological operations includes a fractional morphological operation.

20. The method of claim 1, wherein the set of morphologically-processed target images is a first set of morphologically-processed target images, and wherein the method further comprises performing a refinement stage by:

processing the target image according to a third set of morphological operations to obtain a second set of morphologically-processed target images; and performing object recognition on the second set of morphologically-processed target images for the defined model set only for regions of the target image around the at least one selected candidate occurrence.

21. The method of claim 1, further comprising receiving a mask image associated with the model image and performing a morphological operation on the mask image.

22. The method of claim 2, where the expected variations in the appearance of the object include at least one of a change in polarity of the object, a change in an outline of the object, a fragmentation of the object, and a change in the thickness of the object.

23. The method of claim 22, where the expected variations in the appearance of the object include at least two of the change in polarity of the object, the change in the outline of the object, the fragmentation of the object, and the change in the thickness of the object.

24. The method of claim 1, further comprising including at least one of a dilation operation and an erosion operation in the first set of morphological operations.

25. The method of claim 1, wherein the act of performing object recognition includes determining an association between a set of features extracted from a morphologically-processed target image and a similar set of features associated with a model of the defined model set.

26. The method of claim 1, further comprising including at least one of a dilation operation and an erosion operation in the second set of morphological operations.

27. The method of claim 1, wherein the first set of morphological operations and the second set of morphological operations are the same set of morphological operations.

28. The method of claim 1, further comprising assigning each of the at least one candidate occurrences a score indicative of the degree of correspondence between the respective candidate occurrence and the model.

29. The method of claim 1, further comprising determining at least one of a position of the candidate occurrence in the target image, an orientation of the candidate occurrence in the target image and a scale of the candidate occurrence in the target image.

30. A non-transitory computer-readable medium whose contents cause a processing device including a processor to perform a method of recognizing an occurrence of an object in an image, where the appearance of the object may vary from one occurrence to another, the method comprising:
acquiring a target image;
processing the target image, by the processor, according to a first set of morphological operations to obtain a set of morphologically-processed target images, the set of morphologically-processed target images including a plurality of morphologically-processed target images;
defining a model set for object recognition including acts of:
  acquiring a model image;
  processing the model image, by the processor, according to a second set of morphological operations to obtain a set of morphologically-processed model images, the set of morphologically-processed model images including a plurality of morphologically-processed model images; and
  creating a model from each of the plurality of morphologically-processed model images, respectively;
performing object recognition, by the processor, on each of the morphologically-processed target images of the set of morphologically-processed target images for each of the models of the defined model set; and
selecting at least one candidate occurrence of a model of the defined model set in the target image, by the processor, based on the object recognition performed on each of the morphologically-processed target images of the set of morphologically-processed target images.

31. An apparatus comprising:
a memory configured to store a model image;
one or more processors coupled to the memory;
an image acquisition device coupled to the one or more processors, the image acquisition device configured to acquire a target image; and
a computer storage medium storing instructions that, when executed by the one or more processors, cause the one or more processors to perform operations that recognize an occurrence of an object in the target image, where the appearance may vary from one occurrence to another, the operations including:
processing the target image according to a first set of morphological operations to obtain a set of morphologically-processed target images, the set of morphologically-processed target images including a plurality of morphologically-processed target images;
defining a model set for object recognition including acts of:
  acquiring the model image from the memory;
  processing the model image according to a second set of morphological operations to obtain a set of morphologically-processed model images, the set of morphologically-processed model images including a plurality of morphologically-processed model images; and
  creating a model from each of the plurality of morphologically-processed model images, respectively;
performing object recognition on each of the morphologically-processed target images of the set of morphologically-processed target images for each of the models of the defined model set; and
selecting at least one candidate occurrence of a model of the defined model set in the target image based on the object recognition performed on each of the morphologically-processed target images of the set of morphologically-processed target images.

32. The apparatus of claim 31, wherein the image acquisition device includes a camera configured to capture the target image.

33. The apparatus of claim 32, further comprising a mobile phone including the camera.

34. The apparatus of claim 31, wherein the model image includes a synthetic image output by a software application.

35. A system comprising:
an image acquisition device configured to acquire a target image;
one or more processors coupled to the image acquisition device; and
a computer storage medium storing instructions that, when executed by the one or more processors, cause the one or more processors to perform operations that recognize an occurrence of an object in the target image, where an appearance of the object may vary from one occurrence to another, the operations including:
processing the target image according to a first set of morphological operations to obtain a set of morphologically-processed target images, the set of morphologically-processed target images including a plurality of morphologically-processed target images;
defining a model set for object recognition including acts of:
  acquiring a model image;
  processing the model image according to a second set of morphological operations to obtain a set of morphologically-processed model images, the set of morphologically-processed model images including a plurality of morphologically-processed model images; and
  creating a model from each of the plurality of morphologically-processed model images, respectively;
performing object recognition on each of the morphologically-processed target images of the set of morphologically-processed target images for each of the models of the defined model set; and
selecting at least one candidate occurrence of a model of the defined model set in the target image based on the object recognition performed on each of the morphologically-processed target images of the set of morphologically-processed target images.

* * * * *